(12) United States Patent
Lee

(10) Patent No.: US 11,858,148 B2
(45) Date of Patent: Jan. 2, 2024

(54) ROBOT AND METHOD FOR CONTROLLING THE SAME

(71) Applicant: LG ELECTRONICS INC., Seoul (KR)

(72) Inventor: Dongeun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 231 days.

(21) Appl. No.: 16/910,877

(22) Filed: Jun. 24, 2020

(65) Prior Publication Data

US 2021/0138654 A1 May 13, 2021

(30) Foreign Application Priority Data

Nov. 7, 2019 (KR) .................. 10-2019-0141669

(51) Int. Cl.
*B25J 9/16* (2006.01)
*B25J 5/00* (2006.01)
*B25J 13/08* (2006.01)

(52) U.S. Cl.
CPC ............ *B25J 9/1697* (2013.01); *B25J 5/007* (2013.01); *B25J 13/08* (2013.01)

(58) Field of Classification Search
CPC . B25J 9/1697; B25J 9/126; B25J 9/161; B25J 9/1679; B25J 9/1674; B25J 9/1676; B25J 9/1664; B25J 9/1666; B25J 5/007; B25J 13/08; B25J 11/008; B25J 19/023; G05D 1/0225; G05D 1/0274; G05D 1/0251; G05D 2201/0211; A47L 2201/00; A47L 2201/04
See application file for complete search history.

(56) References Cited

U.S. PATENT DOCUMENTS

| | | | |
|---|---|---|---|
| 9,535,421 B1 * | 1/2017 | Canoso ................ | G05D 1/0248 |
| 2012/0051595 A1 * | 3/2012 | Lee ...................... | G05D 1/0274 382/153 |
| 2014/0200713 A1 * | 7/2014 | Allen .................... | B25J 11/009 901/1 |
| 2017/0259811 A1 * | 9/2017 | Coulter ................ | B60W 10/20 |
| 2018/0353041 A1 * | 12/2018 | Erkek .................. | G05D 1/0234 |
| 2019/0033868 A1 * | 1/2019 | Ferguson ........... | B60H 1/00735 |
| 2019/0120633 A1 * | 4/2019 | Afrouzi ................ | G06T 7/30 |
| 2019/0248014 A1 * | 8/2019 | Deyle .................. | G05D 1/0094 |

* cited by examiner

*Primary Examiner* — Khoi H Tran
*Assistant Examiner* — Nhi Q Bui
(74) *Attorney, Agent, or Firm* — KED & ASSOCIATES, LLP

(57) ABSTRACT

A robot and a method for controlling the robot are provided. The robot includes: at least one motor provided in the robot; a camera configured to capture an image of a door; and a processor configured to determine, on the basis of at least one of depth information and a feature point identified from the image, a target position not overlapping with a moving area of the door, and control the at least one motor such that predetermined operations are performed with respect to the target position. The feature point includes at least one of a handle and a hinge of the door.

12 Claims, 27 Drawing Sheets

ROBOT AND METHOD FOR CONTROLLING THE SAME

CROSS-REFERENCE TO RELATED APPLICATIONS

This application claims priority under 35 U.S.C. § 119 to Korean Application No. 10-2019-0141669 filed on Nov. 7, 2019, whose entire disclosure is hereby incorporated by reference.

BACKGROUND

1. Field

The present disclosure relates to a robot and a method for controlling the same.

2. Background

A robot has been developed for industrial use and has been responsible for a part of factory automation. Recently, fields to which the robot is applied are further spread. For example, a medical robot, an aerospace robot, etc., are being developed and a home robot is being made which can be used for household use. Among these robots, a robot capable of driving itself is called a mobile robot.

As there is a requirement for a service capable of providing users with convenience by using the mobile robot, the mobile robot which serves food or delivers goods is being developed. At present, when the mobile robot arrives at a delivery destination, a user receives goods himself/herself from the mobile robot. However, there is a requirement for a method for efficiently completing the delivery of goods when the current location of the recipient is not the same as the delivery destination or when the recipient is at the delivery destination but cannot directly receive the goods.

BRIEF DESCRIPTION OF THE DRAWINGS

The embodiments will be described in detail with reference to the following drawings in which like reference numerals refer to like elements wherein.

DETAILED DESCRIPTION

Figure 1:
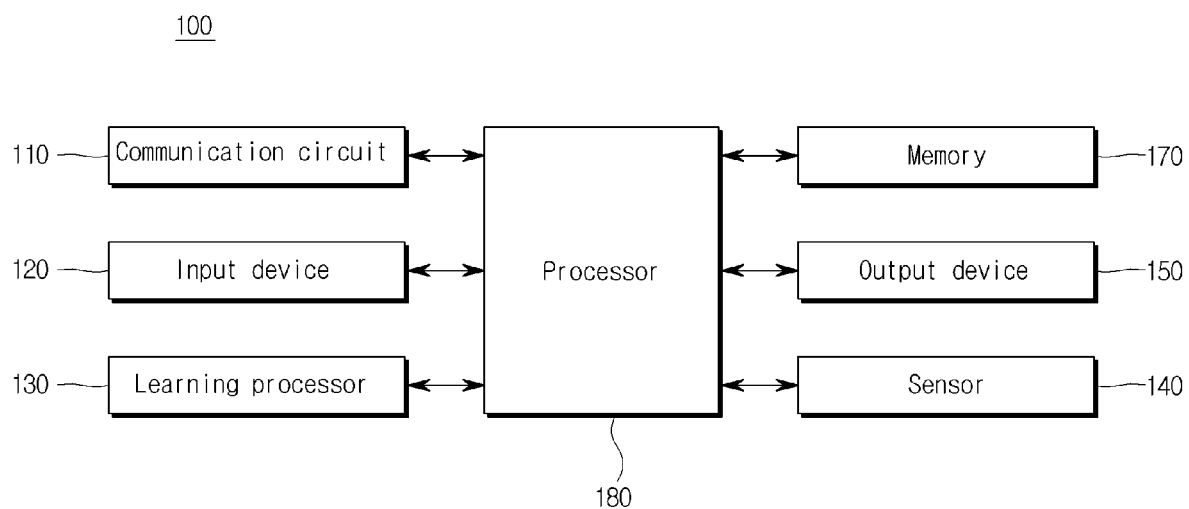
FIG. 1 shows an AI device according to an embodiment of the present invention.

Artificial intelligence refers to a field of studying artificial intelligence or methodology for making artificial intelligence, and machine learning refers to a field of defining various issues dealt with in the field of artificial intelligence and studying methodology for solving the various issues. The machine learning is defined as an algorithm that enhances the performance of a certain task through steady experience with the certain task.

An artificial neural network (ANN) is a model used in the machine learning and may mean all of the models which have a problem-solving ability and are composed of artificial neurons (nodes) that form a network by synaptic connection. The artificial neural network may be defined by a connection pattern between neurons of different layers, a learning process for updating model parameters, and an activation function for generating an output value.

The artificial neural network may include an input layer and an output layer, and optionally one or more hidden layers. Each layer includes one or more neurons, and the artificial neural network may include a synapse that connects a neuron to a neuron. Each neuron in the artificial neural network may output a function value of an activation function for input signals, a weight, and a bias input through the synapse.

The model parameter means a parameter determined by learning and includes the weight of the synaptic connection and bias of the neuron, etc. In addition, a hyper parameter means a parameter to be set before learning in a machine learning algorithm, and includes a learning rate, the number of times of the repetition, a mini batch size, an initialization function, and the like.

The purpose of the learning of the artificial neural network is regarded as determining a model parameter that minimizes a loss function. The loss function may be used as an index for determining an optimal model parameter in the learning process of the artificial neural network.

The machine learning may be classified into supervised learning, unsupervised learning, and reinforcement learning based on a learning method. The supervised learning may refer to a method of training the artificial neural network in a state in which a label for learning data is given. The label may mean a correct answer (or a result value) that the artificial neural network must infer when the learning data is input to the artificial neural network. The unsupervised learning may refer to a method of training the artificial neural network in a state in which a label for learning data is not given. The reinforcement learning may refer to a learning method of training an agent defined in a certain environment to select a behavior or a behavior sequence that maximizes the cumulative reward in each state.

Machine learning, which is implemented by a deep neural network (DNN) including a plurality of hidden layers of the artificial neural networks, is called deep learning, and the deep learning is part of the machine learning. Hereinafter, the machine learning is used as a meaning including the deep running.

A robot may refer to a machine that automatically processes or operates a given task by its own ability. In particular, a robot having a function of recognizing an environment, of making a self-determination, and of performing operation may be referred to as an intelligent robot.

Robots may be classified into industrial robots, medical robots, home robots, military robots, and the like according to the use purpose or field.

The robot can be equipped with a manipulator including an actuator or a motor and can perform various physical operations such as moving a robot joint. In addition, a movable robot may include a wheel, a brake, a propeller, and the like and may travel on the ground or fly in the air.

Autonomous driving refers to a technology enabling a vehicle to travel on its own accord. An autonomous vehicle refers to a vehicle that travels without a user's operation or with a minimum manipulation of the user. For example, the autonomous driving may include a technology for maintaining a lane while driving, a technology for automatically controlling a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having both an internal combustion engine and an electric motor, and an electric vehicle having only an electric motor, and may include not only an automobile but also a train, a motorcycle, and the like. Here, the autonomous vehicle may be regarded as a robot having an autonomous driving function.

Virtual reality (VR), augmented reality (AR), and mixed reality (MR) are collectively referred to as extended reality. The VR technology provides a real-world object and background only in the form of a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

An XR technology may be applied to a head-mount display (HMD), a head-up display (HUD), a mobile phone, a tablet PC, a laptop computer, a desktop computer, a TV, a digital signage, and the like. A device to which the XR technology is applied may be referred to as an XR device.

FIG. 1 shows an AI device according to an embodiment of the present invention. The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation system, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication circuit 110, an input device 120, a learning processor 130, a sensor 140, an output device 150, a memory 170, and a processor 180. The communication circuit 110 may transmit and receive data to and from external devices such as other AI devices 100a to 100e or an AI server 200 by using wire/wireless communication technology. For example, the communication circuit 110 may transmit and receive sensor information, a user input, a learning model, and a control signal, etc., to and from external devices.

Here, the communication technology used by the communication circuit 110 includes Global System for Mobile communication (GSM), Code Division Multi Access (CDMA), Long Term Evolution (LTE), fifth generation communication (5G), Wireless LAN (WLAN), Wireless Fidelity (Wi-Fi), Bluetooth™, Radio Frequency Identification (RFID), Infrared Data Association (IrDA), ZigBee, Near Field Communication (NFC), and the like.

The input device 120 may obtain various types of data. Here, the input device 120 may include a camera for inputting an image signal, a microphone for receiving an audio signal, and a user input unit for receiving information from a user. Here, the camera or the microphone may be treated as a sensor, and the signal obtained from the camera or the microphone may be referred to as sensing data or sensor information.

The input device 120 may obtain a learning data for model learning and an input data, etc., to be used when an output is obtained by using the learning model. The input device 120 may obtain raw input data. In this case, the processor 180 or the learning processor 130 may extract an input feature by preprocessing the input data.

The learning processor 130 may train a model composed of the artificial neural networks by using the learning data. Here, the trained artificial neural network may be referred to as a learning model. The learning model may be used to infer a result value for a new input data instead of the learning data, and the inferred value may be used as a basis for determination to perform a certain operation.

Here, the learning processor 130 may perform AI processing together with a learning processor 240 of the AI server 200. Here, the learning processor 130 may include a memory integrated or implemented in the AI device 100. Alternatively, the learning processor 130 may be implemented by using the memory 170, an external memory directly coupled to the AI device 100, or a memory maintained in an external device.

The sensor 140 may obtain at least one of information on the inside of the AI device 100, information on ambient environment of the AI device 100, and user information. Here, the sensor 140 may be composed in one or more combinations of a proximity sensor, an illuminance sensor, an acceleration sensor, a magnetic sensor, a gyro sensor, an inertial sensor, an RGB sensor, an IR sensor, a fingerprint sensor, an ultrasonic sensor, an optical sensor, a microphone, a lidar, and a radar, etc.

The output device 150 may generate an output related to a visual sense, an auditory sense, or a tactile sense. Here, the output device 150 may include a display for visually outputting information, a speaker for acoustically outputting information, and a haptic actuator for tactually outputting information. For example, the display may output images or videos, the speaker may output voice or sound, and the haptic actuator may cause vibration.

The memory 170 may store data that supports various functions of the AI device 100. For example, the memory 170 may store input data obtained by the input device 120, learning data, a learning model, a learning history, etc. The memory 170 may include at least one of a flash memory type memory, a hard disk type memory, a multimedia card micro type memory, a card type memory (for example, SD or XD memory, etc.), a magnetic memory, a magnetic disk, an optical disk, a random access memory (RAM), a static random access memory (SRAM), a read-only memory (ROM), a programmable read-only memory (PROM), an electrically erasable programmable read only memory (EPMROM).

The processor 180 may determine at least one executable operation of the AI device 100 based on information that is determined or generated by using a data analysis algorithm or the machine learning algorithm. The processor 180 may control the components of the AI device 100 and perform the determined operation.

To this end, the processor 180 may request, search, receive, or utilize data of the learning processor 130 or the memory 170. The processor 180 may control the components of the AI device 100 such that operations which are predicted or are determined to be desirable among the at least one executable operation are performed.

Here, when the processor 180 needs to be associated with an external device in order to perform the determined operation, the processor 180 may generate a control signal for controlling the corresponding external device and transmit the generated control signal to the corresponding external device.

The processor 180 may obtain intention information for the user input and may determine user's requirements based on the obtained intention information. Here, the processor 180 may obtain intention information corresponding to the user input by using at least one of a speech to text (STT) engine for converting voice input into a text string or a natural language processing (NLP) engine for obtaining intention information of a natural language.

Here, at least a portion of at least one of the STT engine or the NLP engine may be composed of an artificial neural network trained according to the machine learning algorithm. At least one of the STT engine or the NLP engine may be trained by the learning processor 130, may be trained by the learning processor 240 of the AI server 200, or may be trained by their distributed processing.

The processor 180 may collect history information including operation contents of the AI device 100 or a user's feedback on the operation, and the like, and store the history information in the memory 170 or in the learning processor 130, or transmit the history information to the external device such as the AI server 200, etc. The collected history information may be used to update the learning model.

The processor 180 may control at least some of the components of the electronic device 100 in order to execute an application program stored in the memory 170. In addition, the processor 180 may operate two or more of the components included in the AI device 100 in combination with each other in order to execute the application program.

Figure 2:
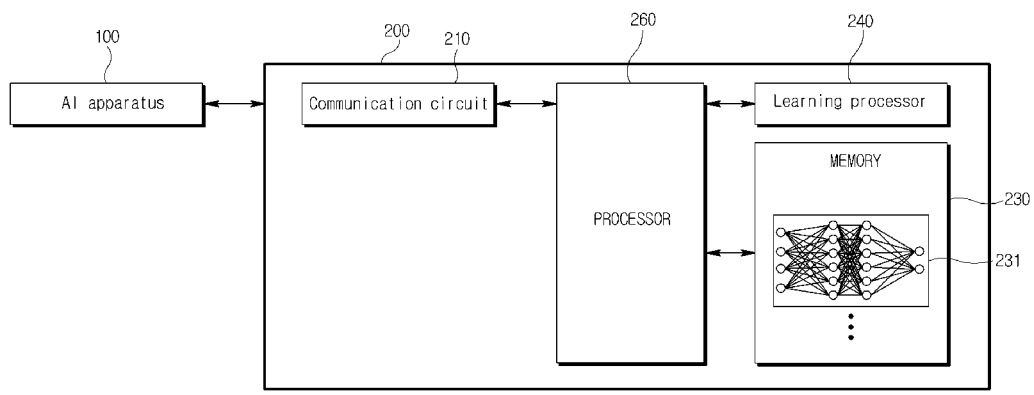
FIG. 2 shows an AI server according to the embodiment of the present invention.

FIG. 2 shows the AI server according to the embodiment of the present invention. Referring to FIG. 2, the AI server 200 may mean a device which trains the artificial neural network by using the machine learning algorithm or mean a device which uses the trained artificial neural network. Here, the AI server 200 may be composed of a plurality of servers to perform distributed processing or may be defined as a 5G network. Here, the AI server 200 may be included as a component of the AI device 100, and may perform at least a portion of the AI processing together.

The AI server 200 may include a communication circuit 210, a memory 230, the learning processor 240, a processor 260, and the like. The communication unit 210 may transmit and receive data to and from an external device such as the AI device 100. The memory 230 may store a model (or an artificial neural network 231) which is being trained or has been trained through the learning processor 240.

The learning processor 240 may train the artificial neural network 231 by using the learning data. The learning model may be used with being mounted on the AI server 200 of the artificial neural network or with being mounted on the external device such as the AI device 100. The learning model may be implemented in hardware, software, or by a combination of hardware and software. When the learning model is partially or wholly implemented in software, one or more instructions constituting the learning model may be stored in the memory 230. The processor 260 may infer a result value for a new input data by using the learning model and may generate responses or control commands based on the inferred result value.

Figure 3:
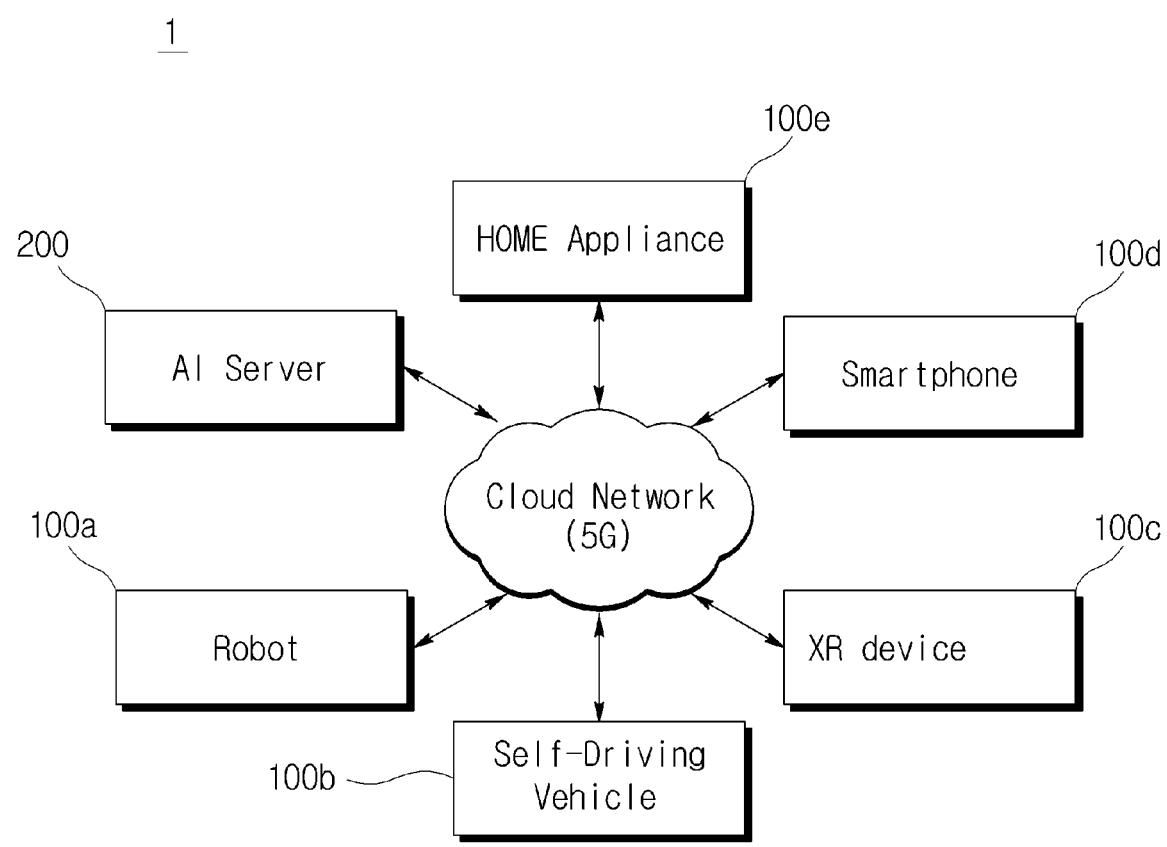
FIG. 3 shows an AI system according to the embodiment of the present invention.

FIG. 3 shows an AI system according to the embodiment of the present invention. Referring to FIG. 3, in the AI system 1, one or more of the AI server 200, a robot 100*a*, an autonomous vehicle 100*b*, an XR device 100*c*, a smartphone 100*d*, or a home appliance 100*e* are connected to a cloud network 10. Here, the robot 100*a*, the autonomous vehicle 100*b*, the XR device 100*c*, the smartphone 100*d*, or the home appliance 100*e*, to which an AI technology is applied, may be referred to as AI devices 100*a* to 100*e*.

The cloud network 10 may mean a network which forms a part of a cloud computing infrastructure or exists within the cloud computing infrastructure. Here, the cloud network 10 may be configured with a 3G network, a 4G or long-term evolution (LTE) network, or a 5G network, etc. That is, the respective devices 100*a* to 100*e* and 200 constituting the AI system 1 may be connected to each other through the cloud network 10. The respective devices 100*a* to 100*e* and 200 can communicate with each other through base stations, and also, they can communicate directly with each other without base stations.

The AI server 200 may include a server which performs artificial intelligence processing and a server which performs operations on big data. The AI server 200 may be connected through the cloud network 10 to at least one of the robot 100*a*, the autonomous vehicle 100*b*, the XR device 100*c*, the smartphone 100*d*, or the home appliance 100*e* which are AI devices that constitute the AI system 1. The AI server 200 may support at least a portion of the artificial intelligence processing of the connected AI devices 100*a* to 100*e*.

Here, the AI server 200 in lieu of the AI devices 100*a* to 100*e* may train the artificial neural network in accordance with the machine learning algorithm and may directly store the learning model or transmit to the AI devices 100*a* to 100*e*. Here, the AI server 200 may receive input data from the AI devices 100*a* to 100*e*, may infer a result value for the received input data by using the learning model, may generate a response or a control command based on the inferred result value, and may transmit the response or the control command to the AI devices 100*a* to 100*e*. Alternatively, the AI devices 100*a* to 100*e* may infer the result value for the input data by directly using the learning model, and may generate a response or a control command based on the inference result value.

Hereinafter, various embodiments of the AI devices 100*a* to 100*e* to which the above-described technology is applied will be described. The AI devices 100*a* to 100*e* shown in FIG. 3 may be regarded as a specific embodiment of the AI device 100 shown in FIG. 1. The AI technology is applied to the robot 100*a* and the robot 100*a* may be implemented as a guide robot, a transport robot, a cleaning robot, a wearable robot, an entertainment robot, a pet robot, an unmanned flying robot, or the like.

The robot 100*a* may include a robot control module for controlling its operations, and the robot control module may mean a software module or may mean a chip obtained by implementing the software module by hardware. The robot 100*a* uses sensor information obtained from various kinds of sensors, thereby obtaining the state information of the robot 100*a*, detecting (recognizing) ambient environment and objects, generating map data, determining a travel path and a driving plan, determining a response to user interaction, or determining the operation. Here, in order to determine the travel path and the driving plan, the robot 100a may use the sensor information obtained from at least one sensor among a lidar, a radar, and a camera.

The robot 100a may perform the above operations by using the learning model composed of at least one artificial neural network. For example, the robot 100a may recognize ambient environment and objects by using the learning model and may determine the operation by using information on the recognized ambient environment or the recognized object. Here, the learning model may be trained directly by the robot 100a or may be trained by external devices such as the AI server 200, etc. Here, the robot 100a may perform the operation by producing a result through the direct use of the learning model and may also perform the operation by transmitting the sensor information to external devices such as the AI server 200, etc., and by receiving the result produced accordingly.

The robot 100a may use at least one of the map data, the object information detected from the sensor information, or the object information obtained from the external device to determine the travel path and the driving plan, and may be made to travel along the determined travel path and driving plan by controlling a driving unit. The map data may include object identification information on various objects disposed in a space where the robot 100a moves. For example, the map data may include the object identification information on fixed objects such as a wall, a door, etc., and movable objects such as a flowerpot, a desk, etc. Also, the object identification information may include names, types, distances, locations, etc.

Also, the robot 100a may perform the operation or travel by controlling the driving unit based on the control/interaction of the user. Here, the robot 100a may obtain intent information of the interaction according to the action or voice utterance of the user and may determine a response based on the obtained intent information and perform the operation.

The AI technology is applied to the autonomous vehicle 100b, and the autonomous vehicle 100b may be implemented as a mobile robot, a vehicle, an unmanned flying vehicle, or the like. The autonomous vehicle 100b may include an autonomous driving control module for controlling an autonomous driving function, and the autonomous driving control module may mean a software module or a chip obtained by implementing the software module by hardware. The autonomous driving control module may be included in the autonomous vehicle 100b as a component thereof, or may be connected to the autonomous vehicle 100b as a separate external hardware.

The autonomous vehicle 100b uses sensor information obtained from various kinds of sensors, thereby obtaining the state information of the autonomous vehicle 100b, detecting (recognizing) ambient environment and objects, generating map data, determining a travel path and a driving plan, or determining the operation. Here, in order to determine the travel path and the driving plan, the autonomous vehicle 100b, as with the robot 100a, may use the sensor information obtained from at least one sensor among the lidar, the radar, and the camera. In particular, the autonomous vehicle 100b may recognize environment or objects of an area where a view is blocked or an area spaced apart by a distance larger than a certain distance, by receiving the sensor information from s, or may receive the information directly recognized by external devices.

The autonomous vehicle 100b may perform the above operations by using the learning model composed of at least one artificial neural network. For example, the autonomous vehicle 100b may recognize ambient environment and objects by using the learning model and may determine a driving line by using information on the recognized ambient environment or the recognized object. Here, the learning model may be trained directly by the autonomous vehicle 100b or may be trained by external devices such as the AI server 200, etc.

Here, the autonomous vehicle 100b may perform the operation by producing a result through the direct use of the learning model and may also perform the operation by transmitting the sensor information to external devices such as the AI server 200, etc., and by receiving the result produced accordingly. The autonomous vehicle 100b may use at least one of the map data, the object information detected from the sensor information, or the object information obtained from the external device to determine the travel path and the driving plan, and may be made to travel along the determined travel path and driving plan by controlling a driving unit.

The map data may include object identification information on various objects disposed in a space (e.g., a road) where the autonomous vehicle 100b travels. For example, the map data may include the object identification information on fixed objects such as a street light, rock, buildings, etc., and movable objects such as vehicles, pedestrians, etc. Also, the object identification information may include names, types, distances, locations, etc.

Also, the autonomous vehicle 100b may perform the operation or travel by controlling the driving unit based on the control/interaction of the user. Here, the autonomous vehicle 100b may obtain intent information of the interaction according to the action or voice utterance of the user and may determine a response based on the obtained intent information and perform the operation.

The AI technology is applied to the XR device 100c and the XR device 100c may be implemented as a head-mount display (HMD), a head-up display (HUD) provided in the vehicle, a television, a mobile phone, a smartphone, a computer, a wearable device, a home appliance, a digital signage, a vehicle, a stationary robot, a mobile robot, or the like. The XR device 100c may analyze three-dimensional point cloud data or image data obtained from various sensors or the external devices, and may generate position data and attribute data for the three-dimensional points, thereby obtaining information on the surrounding space or the real object, and rendering and outputting an XR object to be output. For example, the XR device 100c may cause the XR object including additional information on the recognized object to be output in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. Here, the learning model may be directly trained by the XR device 100c, or may be trained by the external device such as the AI server 200. Here, the XR device 100c may perform the operation by producing a result through the direct use of the learning model and may also perform the operation by transmitting the sensor information to external devices such as the AI server 200, etc., and by receiving the result produced accordingly.

The AI technology and an autonomous driving technology are applied to the robot 100a, and the robot 100a may be implemented as a guide robot, a transport robot, a cleaning robot, a wearable robot, an entertainment robot, a pet robot, an unmanned flying robot, or the like. The robot 100a to which the AI technology and the autonomous driving technology are applied may refer to a robot itself having the autonomous driving function or the robot 100a interacting with the autonomous vehicle 100b.

The robot 100a having the autonomous driving function may be collectively referred to as a device that moves for itself along a given route even without user control or moves by determining the route by itself. The robot 100a having the autonomous driving function and the autonomous vehicle 100b may use a common sensing method so as to determine at least one of the travel path and the driving plan. For example, the robot 100a having the autonomous driving function and the autonomous vehicle 100b may determine at least one of the travel path and the driving plan by using the information sensed through the lidar, the radar, and the camera.

The robot 100a that interacts with the autonomous vehicle 100b exists separately from the autonomous vehicle 100b. Inside or outside the autonomous vehicle 100b, the robot 100a may perform operations associated with the autonomous driving function of the autonomous vehicle 100b or associated with the user who has ridden on the autonomous vehicle 100b. Here, the robot 100a that interacts with the autonomous vehicle 100b may control or assist the autonomous driving function of the autonomous vehicle 100b by obtaining the sensor information on behalf of the autonomous vehicle 100b and providing the sensor information to the autonomous vehicle 100b, or by obtaining the sensor information, generating the ambient environment information or the object information, and providing the information to the autonomous vehicle 100b.

Alternatively, the robot 100a that interacts with the autonomous vehicle 100b may monitor the user who has ridden on the autonomous vehicle 100b, or may control the function of the autonomous vehicle 100b through the interaction with the user. For example, when it is determined that the driver is in a drowsy state, the robot 100a may activate the autonomous driving function of the autonomous vehicle 100b or assist the control of the driving unit of the autonomous vehicle 100b. Here, the function of the autonomous vehicle 100b controlled by the robot 100a may include not only the autonomous driving function but also the function provided by a navigation system or an audio system provided within the autonomous vehicle 100b.

Alternatively, outside the autonomous vehicle 100b, the robot 100a that interacts with the autonomous vehicle 100b may provide information to the autonomous vehicle 100b or assist the function of the autonomous vehicle 100b. For example, the robot 100a may provide the autonomous vehicle 100b with traffic information including signal information and the like such as a smart traffic light, and may automatically connect an electric charger to a charging port by interacting with the autonomous vehicle 100b like an automatic electric charger of an electric vehicle.

The AI technology and the XR technology are applied the robot 100a, and the robot 100a may be implemented as a guide robot, a transport robot, a cleaning robot, a wearable robot, an entertainment robot, a pet robot, an unmanned flying robot, a drone, or the like. The robot 100a to which the XR technology is applied may refer to a robot that is subjected to control/interaction in an XR image. In this case, the robot 100a may be separated from the XR device 100c and interwork with each other.

When the robot 100a which is subjected to control/interaction in the XR image obtains the sensor information from the sensors including a camera, the robot 100a or the XR device 100c may generate the XR image based on the sensor information, and the XR device 100c may output the generated XR image. The robot 100a may operate based on the control signal input through the XR device 100c or based on the user interaction. For example, the user may check the XR image corresponding to a view of the robot 100a interworking remotely through the external device such as the XR device 100c, may control the autonomous driving path of the robot 100a through the interaction, may control the operation or driving, or may check information on the surrounding objects.

The AI technology and the XR technology are applied the autonomous vehicle 100b, and the autonomous vehicle 100b may be implemented as a mobile robot, a vehicle, an unmanned flying vehicle, or the like. The autonomous vehicle 100b to which the XR technology is applied, may refer to an autonomous vehicle equipped with a means for providing an XR image or an autonomous vehicle that is subjected to control/interaction in an XR image. Particularly, the autonomous vehicle 100b that is subjected to control/interaction in an XR image may be separated from the XR device 100c and interwork with each other.

The autonomous vehicle 100b equipped with the means for providing an XR image may obtain the sensor information from the sensors including a camera and may output the XR image generated based on the obtained sensor information. For example, the autonomous vehicle 100b may include a HUD to output an XR image, thereby providing a passenger with an XR object corresponding to a real object or an object in the screen.

Here, when the XR object is output to the HUD, at least a part of the XR object may be output so as to overlap an actual object to which the passenger's gaze is directed. Meanwhile, when the XR object is output to the display provided within the autonomous vehicle 100b, at least a part of the XR object may be output so as to overlap the object in the screen. For example, the autonomous vehicle 100b may output XR objects corresponding to objects such as a lane, another vehicle, a traffic light, a traffic sign, a two-wheeled vehicle, a pedestrian, a building, and the like.

When the autonomous vehicle 100b that is subjected to control/interaction in the XR image obtains the sensor information from the sensors including a camera, the autonomous vehicle 100b or the XR device 100c may generate the XR image based on the sensor information, and the XR device 100c may output the generated XR image. The autonomous vehicle 100b may operate based on the control signal input through the external device such as the XR device 100c or based on the user interaction.

Hereinafter, various embodiments of a control method of the robot 100a will be described as an example of the AI device 100. However, the following embodiments are not limited to be applicable only to the robot 100a, and may be applied to other AI devices 100b to 100e within a range in which the spirit is not changed. For example, the following embodiments may be applied to the autonomous vehicle 100b, the XR device 100c, etc., implemented as a mobile robot or the like.

Figure 4A:
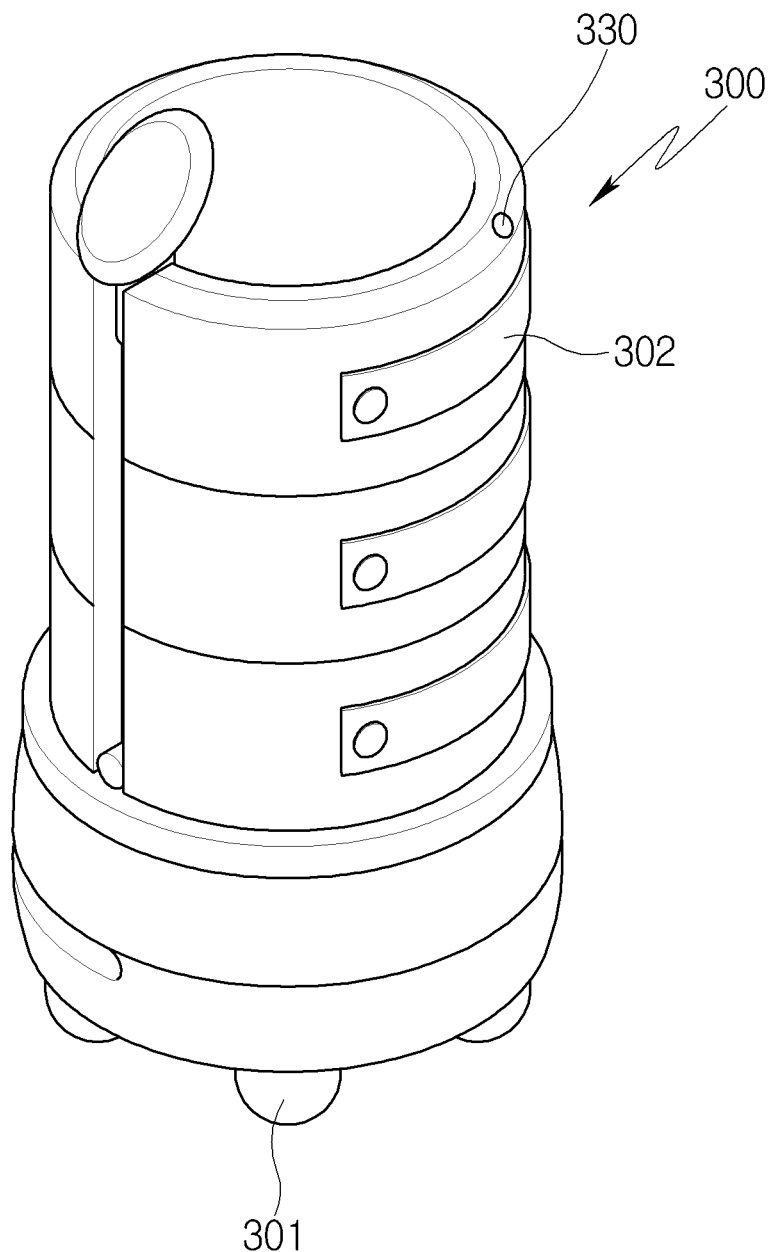
FIGS. 4A to 4C are perspective views of a robot according to various embodiments.
Figure 4B:
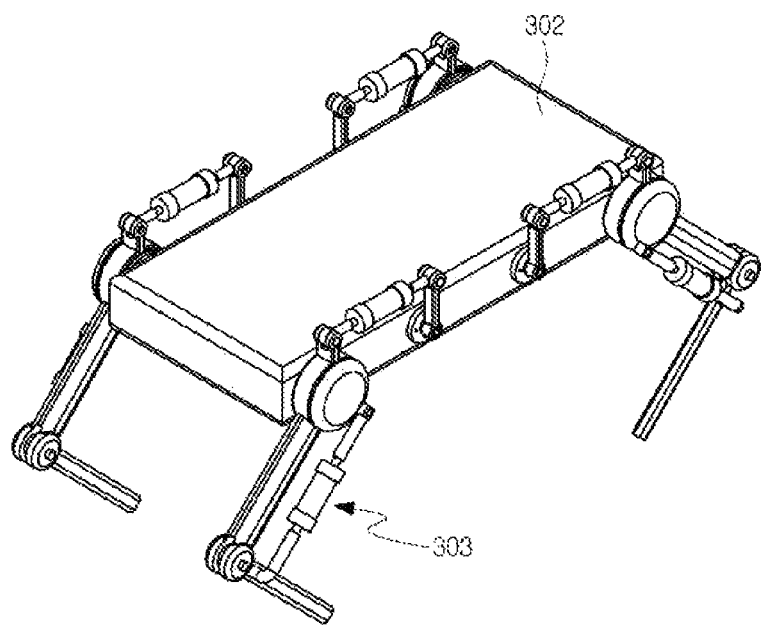
Figure 4C:
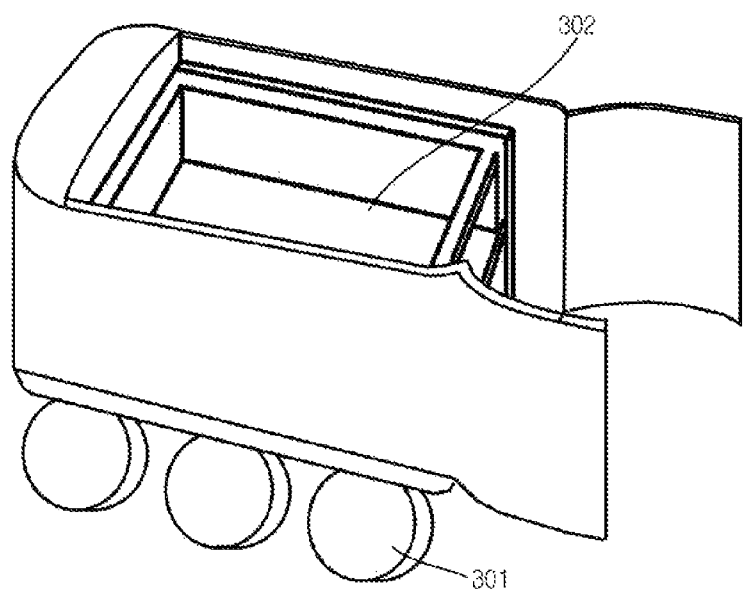
Figure 5:
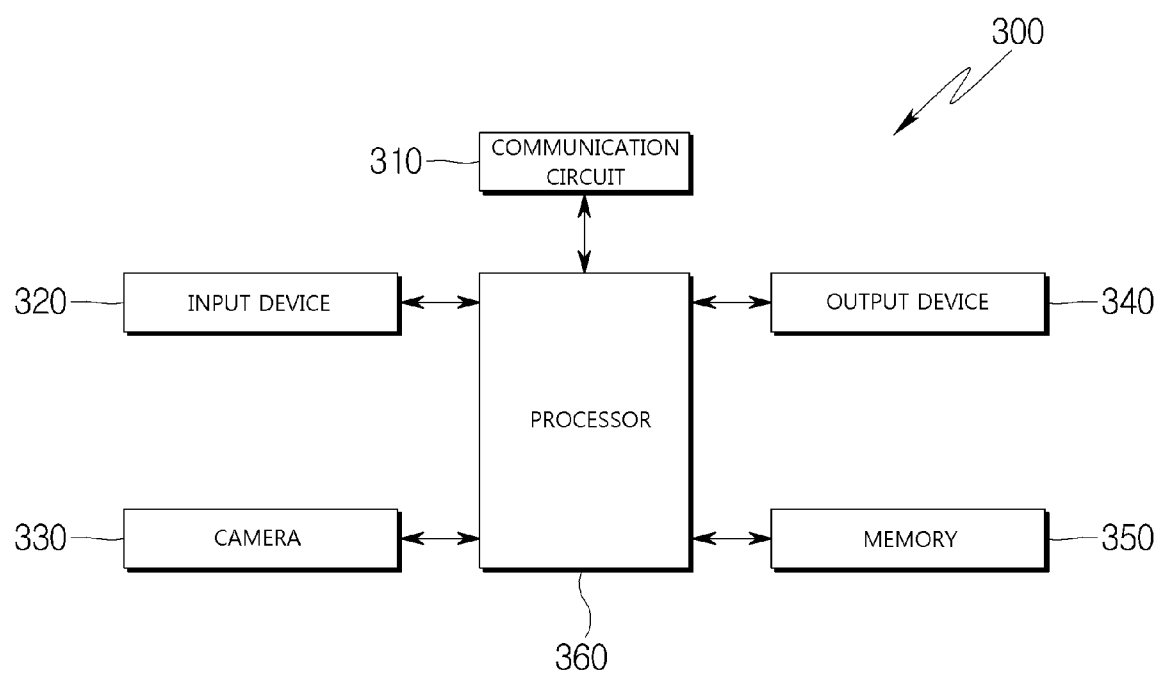
FIG. 5 is a block diagram showing the configuration of the robot according to the embodiment.

FIGS. 4A to 4C are perspective views of the robot according to various embodiments, and FIG. 5 is a block diagram showing the configuration of the robot according to the embodiment of the present invention. A robot 300 is the AI device 100 described with reference to FIGS. 1 to 3, and may be, for example, the robot 100a shown in FIG. 3. In description of the embodiments of FIGS. 4A to 4C and 5, repetitive descriptions of components the same as or similar to those shown in FIGS. 1 to 3 will be omitted.

Referring to FIG. 4A, the robot 300 may include a drive wheel 301 and may be a mobile robot capable of moving in an autonomous driving method and/or in a following driving method. The drive wheel 301 may be provided by using a motor (not shown). While FIG. 4 shows that the robot 300 includes four drive wheels 301, the embodiment of the present disclosure is not limited thereto. That is, the robot 300 may be provided with two or more drive wheels 301, and, for example, may be driven by a front wheel or a rear wheel when the robot 300 includes four or more drive wheels 301.

Although FIG. 4A shows that the robot 300 moves by using the drive wheel 301, the embodiment is not limited to this. That is, in various embodiments, the robot 300 may be configured to include, as shown in FIG. 4B, at least one leg 303, etc., and to move. The leg 303 is able to move the robot 300 by means of a motor and/or an actuator, etc., which is manipulated by a manipulator within the robot 300.

In the following embodiments, the drive wheel 301, the leg 303, the motor, the actuator and/or the manipulator may be designated as a driving part, as a control device capable of moving the robot 300. The robot 300 may include at least one container 302 capable of receiving goods to be delivered. The at least one container 302 may be stacked in the vertical direction and/or in the lateral direction and may be integrally molded or physically fastened. Each container 302 may be configured to load goods individually by being composed of a drawer-type module shown in FIG. 4A or by including a door. Alternatively, each container 302 may be, as shown in FIGS. 4B and 4C, configured in the form of a deck. Particularly, in the embodiment shown in FIG. 4C, the deck type container 302 may be configured to be able to move up and down by means of an elevating member.

In other various embodiments, when the robot 300 has a robot arm, the robot 300 is also able to grip goods by using the robot arm without a separate container 302. In various embodiments, the robot 300 may further include a physical structure such as a sliding module (shown in FIGS. 21 to 24) for unloading goods loaded in the container 302, the elevating module, or the robot arm, etc. Such a physical structure may include at least one joint which is controlled by the manipulator including the actuator and/or the motor.

Referring to FIG. 5, the robot 300 may include a communication circuit 310, an input device 320, a camera 330, an output device 340, a memory 350, a processor 360, and a motor 370. The communication circuit 310 may perform communication with external devices (e.g., the AI server 200 shown in FIG. 2) by using wired and wireless communication channels. The communication circuit 310 may include, for example, an antenna circuit, a wireless communication circuit, a wired communication circuit, etc. The communication circuit 310 may convert a signal received from the external device into data that can be processed by the processor 360 and transmit the data to the processor 360.

In various embodiments, the communication circuit 310 may communicate with the terminal of a manager who wants to send goods and the terminal of a recipient who receives the goods. The communication circuit 310 may communicate with the terminal of the manager or the terminal of the recipient through a server (e.g., the AI server 200) and the like by using a long-range wireless communication technology (e.g., Wi-Fi, LTE, LTE-A, 5G, etc.), or may communicate directly with the terminal of the manager or the terminal of the recipient by using a short-range wireless communication technology (e.g., Bluetooth, NFC, etc.).

The input device 320 may receive data or commands for the control of components from the outside, for example, a user. The user may be, for example, a manager who sends goods or a recipient who receives the goods. The input device 320 may include, for example, a camera, a microphone, a touch panel, a button, a switch, a keypad, a jog dial, a jog switch, and the like.

In various embodiments, the input device 320 may receive information on goods (e.g., the type, quantity, size of the goods, whether to handle the goods with care, invoice number of the goods, etc.) from the manager who wants to deliver the goods and information on the recipient (e.g., the name and contact address of the recipient, and the address of a delivery destination, etc.). In addition, in various embodiments, the input device 320 may receive recipient identification information (e.g., an ID, password, OTP, image identification information (fingerprint, face, etc.), etc.).

In various other embodiments, the above-listed information may be received from external devices (e.g., a server, the terminal of the manager, the terminal of the recipient, etc.) through the communication circuit 310. In the embodiment, when the robot 300 is implemented by a communication input method that receives the user input only from external devices, the input device 320 may be omitted.

The camera 330 may capture still images and videos. In one embodiment, the camera 330 may include one or more lenses, an image sensor, an image signal processor, a flash, and the like. The camera 330 may be mounted on various parts of the robot 300. While FIGS. 4A to 4C show an example in which the camera 330 is provided in the front of the robot 300, the camera 330 may be installed on the rear, side, etc., of the robot 300 in other embodiments. The camera 330 may be provided as a fixed type as shown in FIGS. 4A to 4C. Also, in another embodiment, the camera 330 may be provided rotatably up and down and/or right and left.

In the embodiment, the camera 330 is configured with a stereo camera, an array camera, a 3D vision sensor, a time of flight (TOF) sensor, etc., and, thus, is able to obtain depth information of an image. Alternatively, the camera 330 may be, as a mono camera, arranged in various positions of the robot 300. In such an embodiment, through an image obtained from each mono camera, the depth information of the image may be obtained.

In various embodiments, the camera 330 may operate as the input device 320 that obtains information on goods by capturing a document, a barcode, a QR code, etc., in which the information on goods is recorded. In addition, the camera 330 may operate as the input device 320 that obtains recipient identification information by capturing a recipient's face, fingerprint, or the like.

The output device 340 may visually, audibly, and/or tactually output the information through a display, a speaker, a haptic actuator, etc. In the embodiment, the display is implemented integrally with a touch panel for receiving user inputs and thus configure a touch screen.

In the embodiment, information to be output from the robot 300 may be transmitted to an external device through the communication circuit 310 or the like. For example, the information generated from the robot 300 may be transmitted to the terminal of the manager and the terminal of the recipient through a long-range wireless communication technology (e.g., Wi-Fi, LTE, LTE-A, 5G, etc.), and may be output visually, aurally, and/or tactually from the terminal of the manager and the terminal of the recipient. Also, for example, the information generated from the robot 300 may be transmitted to another display or speaker, etc., through a short-range wireless communication technology (e.g., Bluetooth, NFC, etc.), and may be output visually and/or aurally from another display or speaker. In the embodiment, when the robot 300 is implemented to have a communication output method that outputs the generated information only through an external device, the output device 340 may be omitted.

The memory 350 may store various data used by at least one component (e.g., the processor 360) of the robot 300. The data may include, for example, software and input/output data related to the software. The memory 350 may include a volatile memory or a nonvolatile memory. In various embodiments, when the robot 300 operates in a cloud environment, the memory 350 may be implemented by using a remote memory location that is allocated through a cloud computing system and is accessible by the robot 300 through communication. In this embodiment, the robot 300 includes the non-volatile memory, so that it may temporarily store some or all of both raw data before being stored in the remote memory location and/or data to be stored in the remote memory location.

The processor 360 may control the above-described components in order to perform the robot control method according to the present invention. In various embodiments, the processor 360 may extract feature points from the image captured through the camera 330 and may analyze the extracted feature points to determine a target position of the robot 300. The processor 360 may control a manipulator (not shown) driven by an actuator or a motor 370 such that the robot 300 moves to the determined target position. Further, the processor 360 may control the manipulator such that the robot 300 unloads the goods at the target position or waits at the target position.

Figure 6:
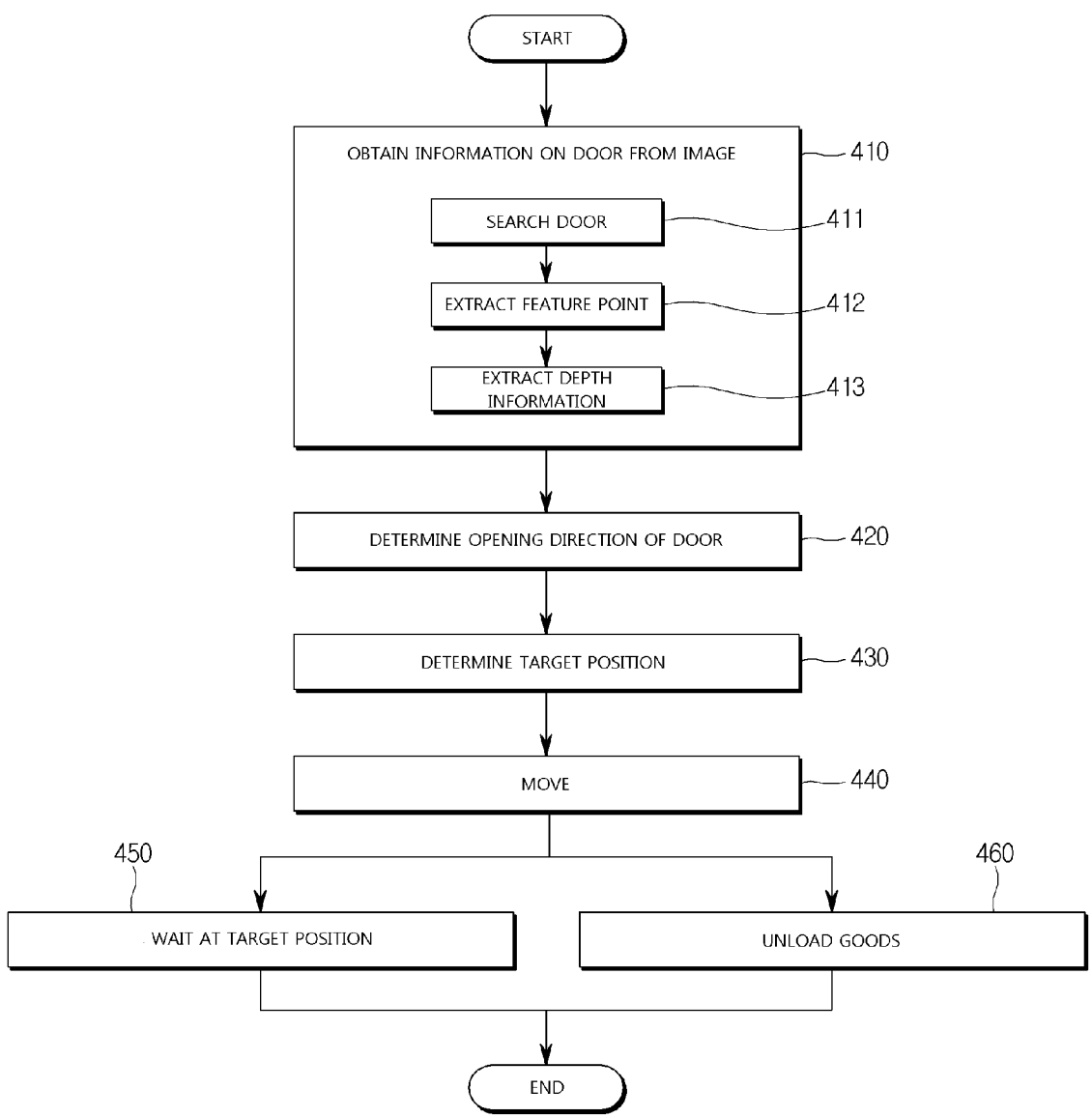
FIG. 6 is a flowchart showing a method for controlling the robot according to the embodiment.

Hereinafter, the control method of the robot 300 by the processor 360 will be described in more detail. FIG. 6 is a flowchart showing the control method of the robot according to the embodiment. The control method of the robot 300 shown in FIG. 6 may be performed after the goods are loaded by the manager and the robot 300 arrives at a delivery destination based on pre-input information on the recipient.

After arriving at the delivery destination, the robot 300 may obtain information on the door from the image of the delivery position (410). Specifically, the robot 300 may perform a door search based on the image (411). The robot 300 may continuously capture the surroundings including the front of the robot 300 through the camera 330. While continuously capturing, the robot 300 may move within a predetermined range. For example, if a distance between the robot 300 and the door is extremely close and thus the entire door does not come within the viewing angle of the camera 330, the robot 300 may not correctly search the door. Therefore, the robot 300 may capture the surroundings while moving the current position such that a whole object that can be recognized as the door comes within the viewing angle of the camera 330.

The robot 300 may identify objects in the continuously captured images and recognize the door. For example, the robot 300 may detect a contour from the captured images by using a mask such as Sobel, Roberts, Canny, Prewitt, etc., and determine whether the detected contour has a rectangular shape that can be generally recognized as a door or not. If necessary, the robot 300 may perform preprocessing on the captured image. The preprocessing can perform cropping, scaling, image rotation, noise removal, contrast control, blur removal, background region removal, distortion correction, etc., for a specific region.

In the embodiment, the robot 300 may perform a door search for a predetermined period of time. If the door is not searched, the robot 300 may determine the door as not being around. In this embodiment, the robot 300 may determine the current position as the target position without separately determining the target position to be described later.

When a door is searched from the image, the robot 300 may extract a feature point of the door from the image (412). The feature point may include, for example, hinges, handles, and the like. The robot 300 may extract the feature points of the door by using an active contour model (ACM), an active shape model (ASM), an active appearance model (AAM) or known feature point extraction techniques such as a supervised descent method (SDM).

In the embodiment, the robot 300 may further extract depth information on the searched door and/or the surrounding wall surface of the door (413). When the camera 330 is implemented as a stereo camera, an array camera, a 3D vision sensor, and the like, the robot 300 may directly obtain the depth information from the camera 330. When the camera 330 is implemented as a mono camera, the robot 300 may obtain images from a plurality of the cameras 330 disposed in various positions of the robot 300 and may determine the depth information by comparing the disparity between the obtained images.

In addition, the robot 300 may determine the size of the door, for example, the width of the door, based on the depth information. By using the size of the door and the depth information of the door based on the pixel size in the image, the actual size of the door can be calculated.

On the other hand, while FIG. 6 shows that the robot 300 extracts the feature point first for the searched door and then extracts the depth information, this embodiment is not limited thereto. That is, in various embodiments, the feature points may be extracted after the depth information is obtained from the image, or the feature point extraction may be performed simultaneously with the depth information acquisition.

Figure 7:
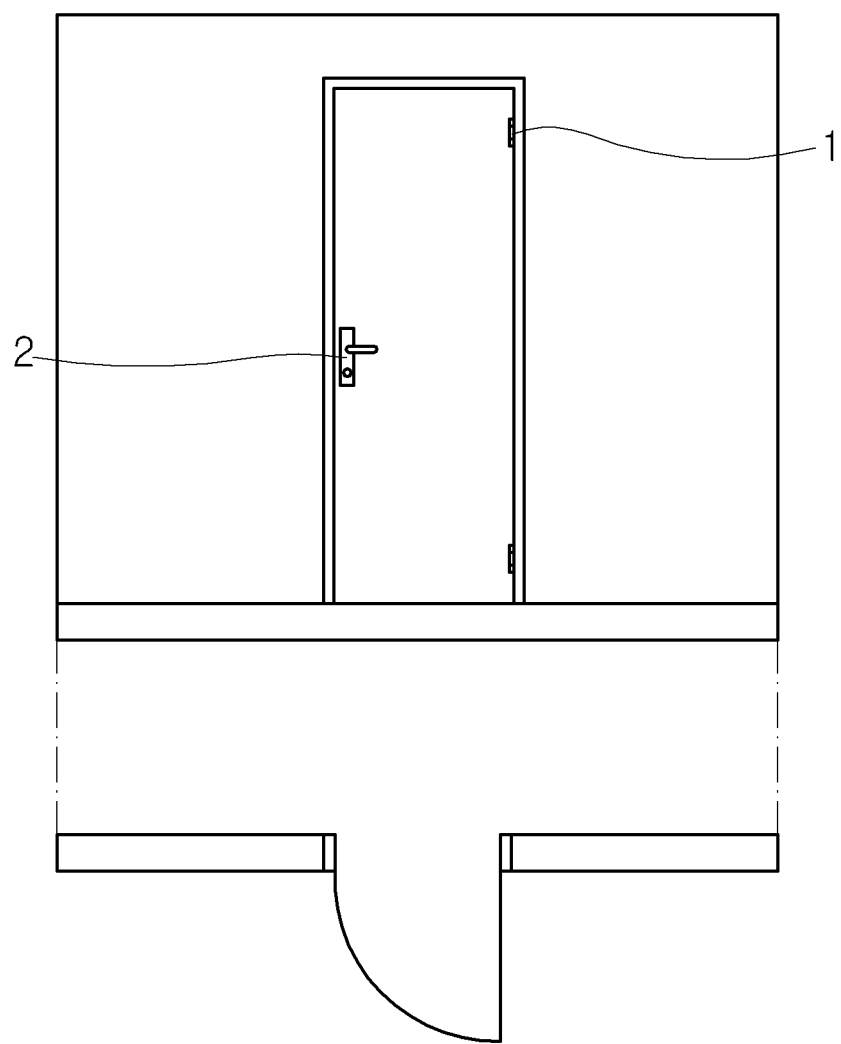
FIGS. 7 to 10 show various embodiments of an opening direction of a door.
Figure 8:
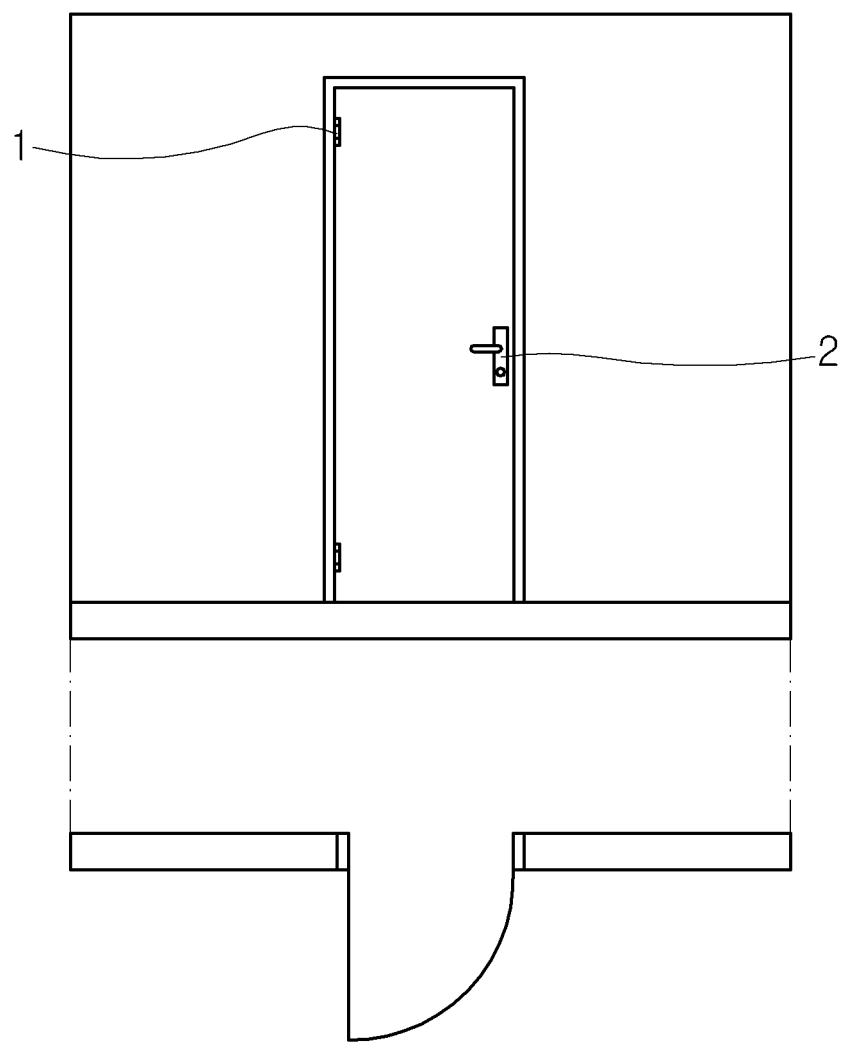

Also, at least one of the feature point extraction and the depth information acquisition may be omitted. For example, when the opening direction of the door can be determined only by the extracted feature point (e.g., a hinge) as described below (e.g., when a hinge is, as shown in FIGS. 7 and 8, extracted as the feature point, the door is opened to the side where the robot 300 is located), the extraction of the depth information may be omitted. Similarly, when it is possible to determine the opening direction of the door only by the depth information (e.g., as shown in FIG. 9, when the door is identified as being deeper than the surrounding wall surfaces, it is determined that the door is opened to the opposite side to the position of the robot 300), the feature point extraction may be omitted.

When the robot 300 includes the learning processor 130 described with reference to FIG. 1, the above-described image analysis may be performed through the learning processor 130. For example, when an image captured through the camera 330 is input to the learning processor 130, the learning processor 130 may recognize a door included in the input image. The learning processor 130 can analyze the feature point, the depth information, and the size of the recognized door.

The robot 300 may determine the opening direction of the door based on the obtained information on the door (420). Specifically, the robot 300 may determine the opening direction of the door based on at least one of the feature point, the depth information, and the size which are extracted from the image.

Figure 9:
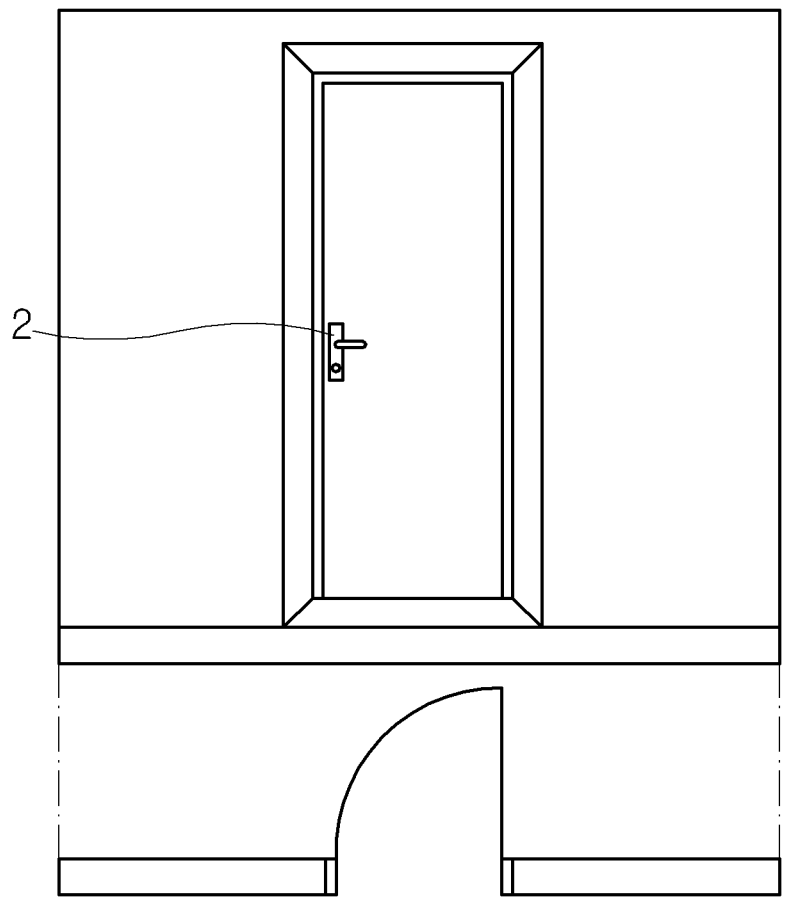
Figure 10:
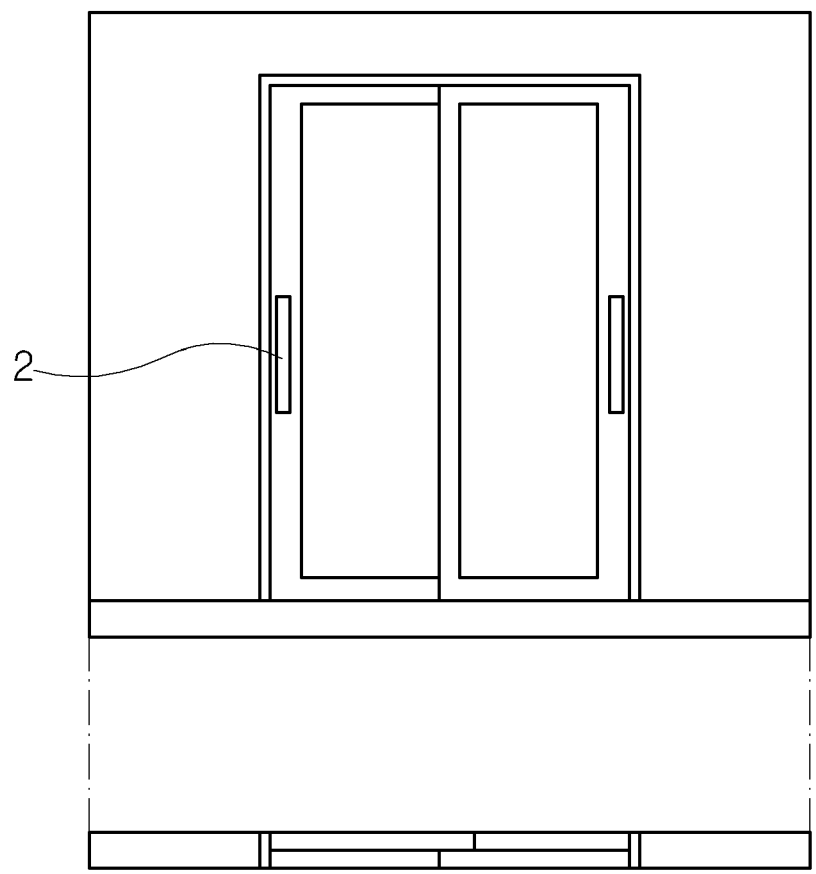

FIGS. 7 to 10 show various embodiments of the opening direction of a door. In various embodiments, a hinge is formed in the opening direction of the door. As shown in FIGS. 7 and 8, when the door is opened to the side where the robot 300 is located, the hinge 1 may be extracted as the feature point. Conversely, when the door is, as shown in FIG. 9, opened to the opposite side to the position of the robot 300, or when the door is, as shown in FIG. 10, a sliding door, the hinge may not be extracted as the feature point.

Also, the hinge 1 may be formed on the opposite side to a side where the door is opened. For example, when the door is opened on the left side, the hinge 1 may be, as shown in FIG. 7, disposed on the right side of the door, and when the door is opened on the right side, the hinge 1 may be, as shown in FIG. 8, disposed on the left side of the door.

In various embodiments, a handle may be formed on a side the door is opened. For example, when the door is opened on the left side, the handle 2 is, as shown in FIG. 7, disposed on the left side of the door, and when the door is opened on the right side, the handle 2 is, as shown in FIG. 8, disposed on the right side of the door.

As described above, the robot 300 may determine the opening direction of the door based on whether or not the hinge is extracted as the feature point from the image and of the arrangement position of the handle. In various embodiments, the robot 300 may further determine the opening direction of the door based on the depth information. In the embodiment, as shown in FIG. 9, when the door is installed deeper than the surrounding wall surfaces, the door may be opened to the opposite side to the position of the robot. Accordingly, the robot 300 may determine that the door is opened to the opposite side to the position of the robot when the depth of the door is greater than that of the surrounding wall surface by a threshold or more.

The robot 300 may determine the target position based on the determined opening direction of the door (430). The target position may not overlap with the moving line of the door. That is, the target position may be a position in which the moving line of the recipient moving through the door from the opposite side of the door is not disturbed by the robot 300 or the goods unloaded from the robot 300. When the robot 300 waits at the determined target position or the robot 300 unloads the goods at the determined target position, the moving line of the door and the moving line of the recipient moving to the door may not be disturbed. In the embodiment, the target position may be a position where the robot 300 can stably unload the goods, for example, a position where a wall surface that the robot 300 can support is located.

Figure 11:
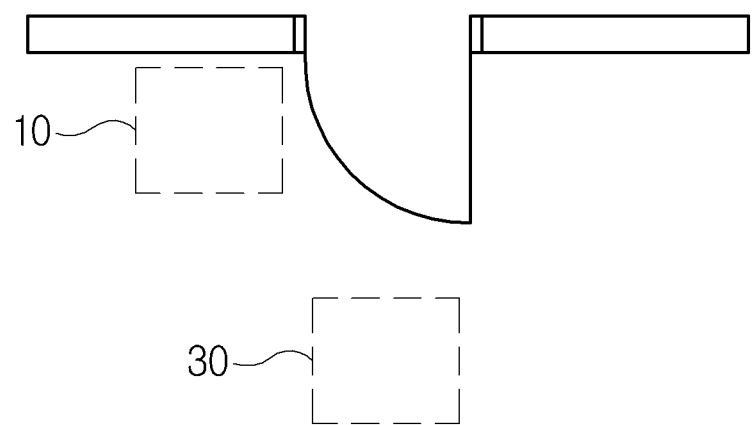
FIGS. 11 to 14 show various embodiments of a target position determined by the robot.

FIGS. 11 to 14 show various embodiments of the target position determined by the robot. In the embodiment, when the hinge 1 is extracted as the feature point, the robot 300 may determine, as shown in FIG. 11, a first position 10 that is in contact with the wall surface of one side of the door as the target position. Here, the robot 300 may select a wall surface disposed further away from the hinge 1 among the wall surfaces on both sides of the door as the wall surface.

Figure 12:
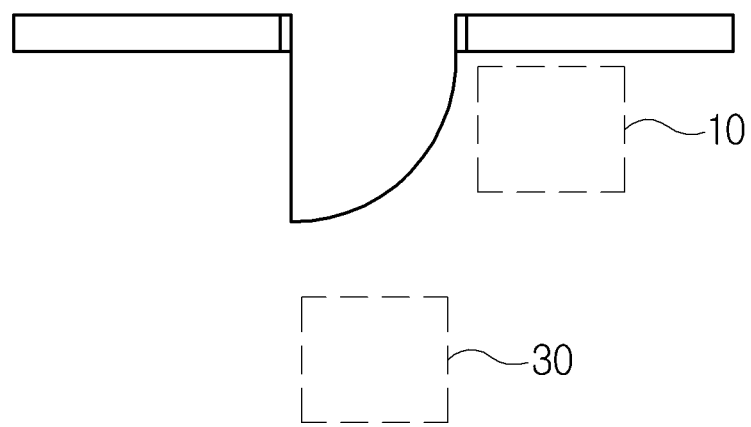

Generally, the door is opened in the direction in which the hinge 1 is viewed and recognized, and, with the hinge as an axis, is opened on the opposite side to the hinge 1. Therefore, when the hinge 1 is viewed and recognized from the right side of the door, the robot 300 may determine that the door is opened toward the robot 300 from the left side as shown in FIG. 11. In addition, the robot 300 may determine, as the target position, the first position 10 that is in contact with the left wall surface disposed further away from the hinge 1 among the wall surfaces on both sides of the door. Similarly, when the hinge 1 is viewed and recognized from the left side of the door, the robot 300 may determine that the door is opened toward the robot 300 from the right side as shown in FIG. 12. In addition, the robot 300 may determine, as the target position, a second position 20 that is in contact with the right wall surface disposed further away from the hinge 1 among the wall surfaces on both sides of the door.

When the hinge 1 is extracted from the image, the robot 300 may further extract the handle 2 as the feature point. Then, the robot 300 may select a wall surface disposed adjacent to the handle 2 among the wall surfaces on both sides of the door as the wall surface. Generally, the door is opened on the side where the handle 2 is disposed. Therefore, when the hinge is extracted from the image and the handle is extracted from the left side of the door, the robot 300 may determine that the door is opened from the left side of the door to the side where the robot 300 is located. In addition, the robot 300 may determine the first position 10 that is in contact with the wall surface on the left side of the door as the target position, as shown in FIG. 11.

Similarly, when the hinge is extracted from the image and the handle 2 is extracted from the right side of the door, the robot 300 may determine that the door is opened toward the robot 300 from the right side of the door. In addition, the robot 300 may determine the second position 20 that is in contact with the wall surface on the right side of the door as the target position, as shown in FIG. 12.

In the embodiment, when the hinge 1 is extracted as the feature point, the robot 300 may determine, as the target position, a third position 30 spaced apart from the door by a distance corresponding to the width of the door, as shown in FIGS. 11 and 12. Such an embodiment may be applied, for example, when a sufficient space for the robot 300 to enter the first position 10 or the second position 20 is not formed. However, the present embodiment is not limited thereto, and the third position 30 may be determined as the target position with a higher priority than that of the first position 10 or the second position 20 of the door.

In the above embodiments, the recipient can safely open the door without being disturbed by the robot 300 located at the target positions 10, 20, and 30 or by the goods unloaded at the target positions 10, 20, and 30. In addition, the recipient can recognize the robot 300 or the unloaded goods disposed in the first position 10 or the second position 20 as soon as the recipient opens the door.

Figure 13:
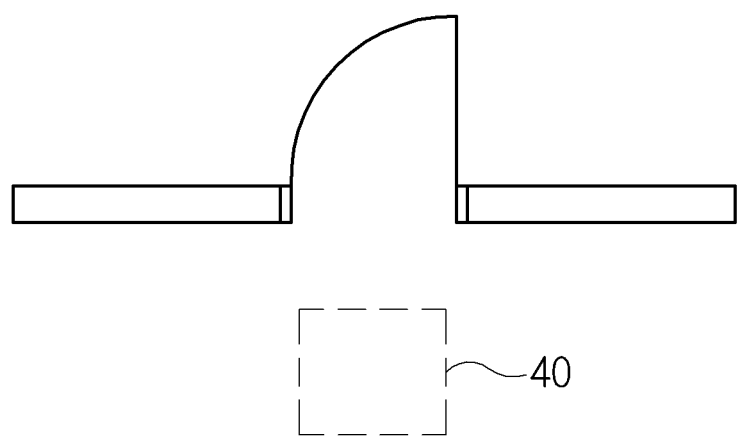
Figure 14:
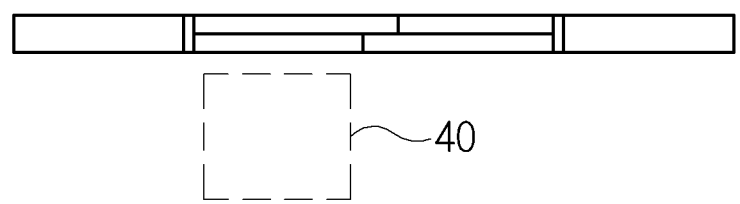

In the embodiment, when the hinge 1 is not extracted as the feature point, the robot 300 may determine a fourth position 40 that is in contact with the door as a target position, as shown in FIGS. 13 and 14. When the hinge 1 is not extracted as the feature point, the door may be, as shown in FIG. 13, opened to the opposite side to the position of the robot 300 or may be, as shown in FIG. 14, a sliding door. In this embodiment, even if the robot 300 or the goods unloaded from the robot 300 is located in the fourth position 40, this does not interfere with the opening of the door by the recipient. Rather, when the robot 300 is arranged in the fourth position 40 or the goods unloaded from the robot 300 are arranged in the fourth position 40, the recipient who has opened the door can more easily access the robot 300 or the goods.

Meanwhile, as shown in FIGS. 11 and 12, when the target position is determined as the first position 10 or the second position 20, the target position may contact the wall surface. Such a target position enables the robot 300 to unload the goods more stably by supporting the wall surface when the goods are unloaded by the robot 300. The method in which the robot 300 unloads the goods by using the wall surface will be described below in more detail with reference to FIGS. 21 to 24.

Figure 15:
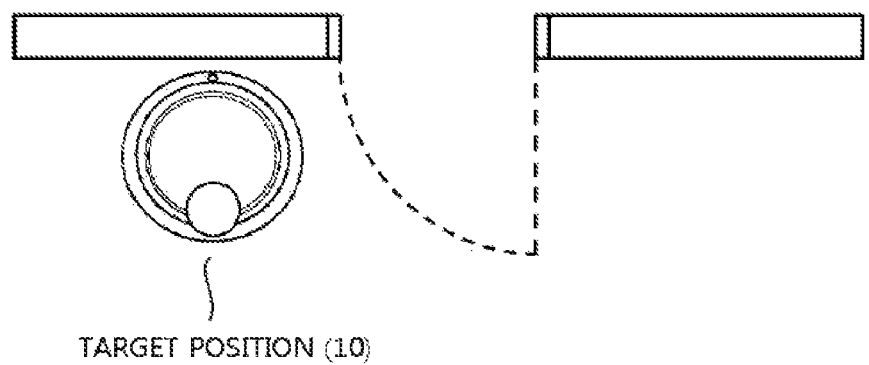
FIGS. 15 to 20 show various operations of the robot for the target position.
Figure 16:
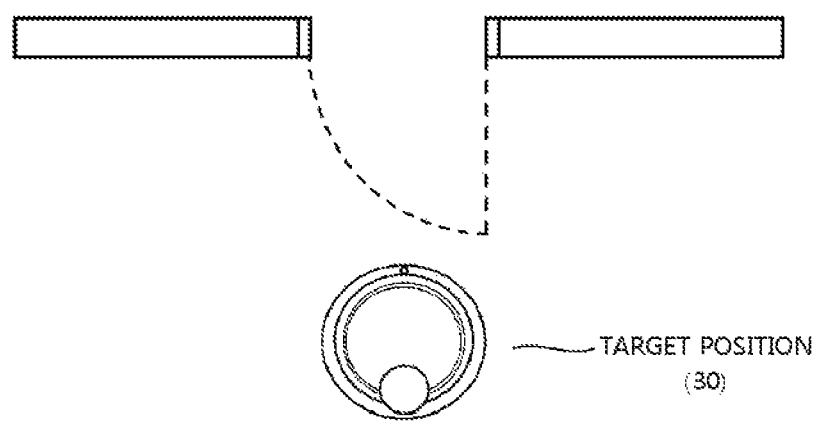
Figure 17:
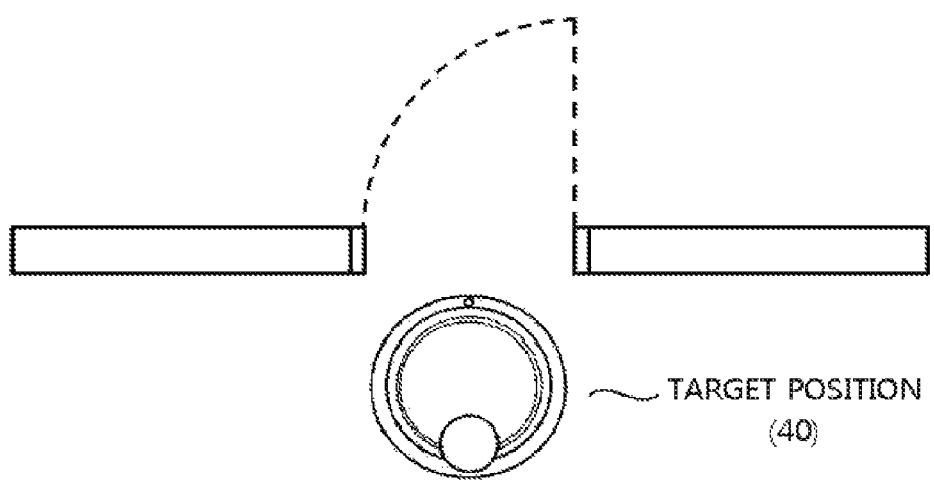
Figure 18:
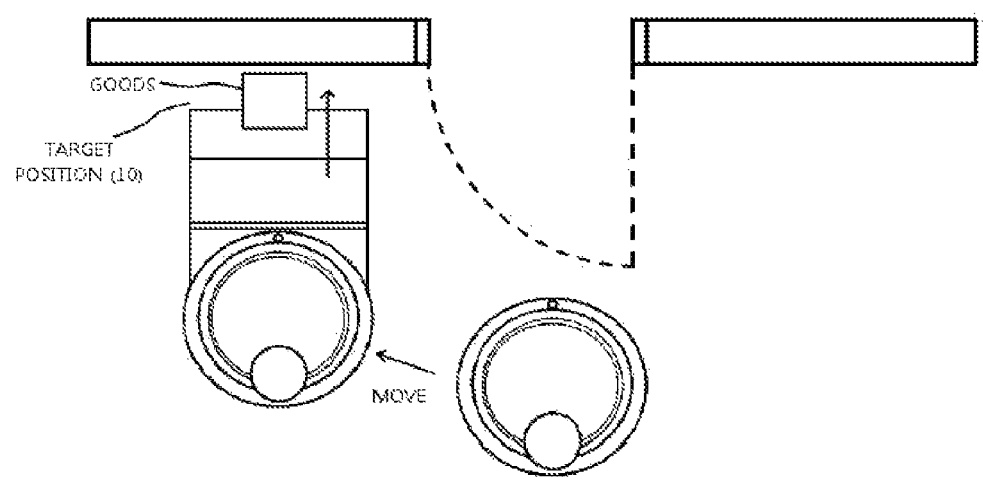
Figure 19:
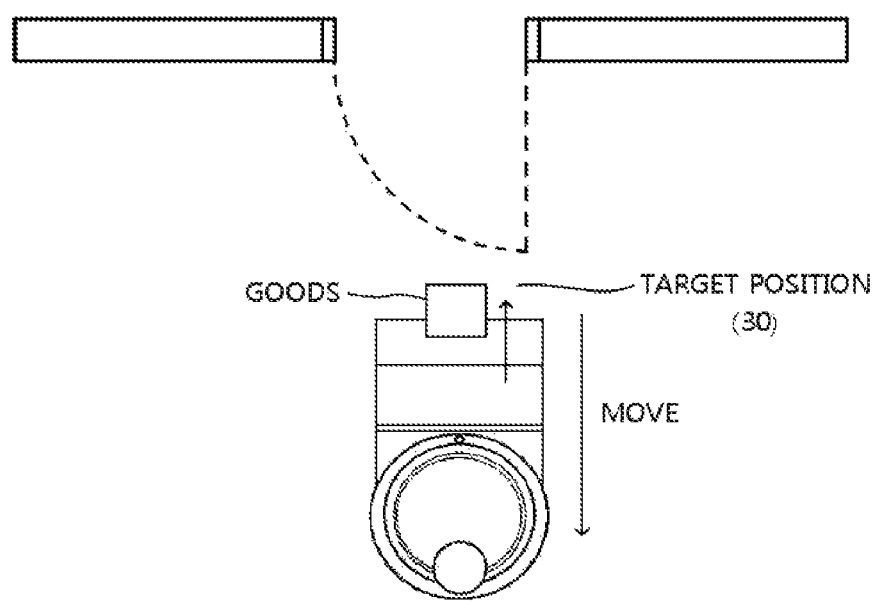
Figure 20:
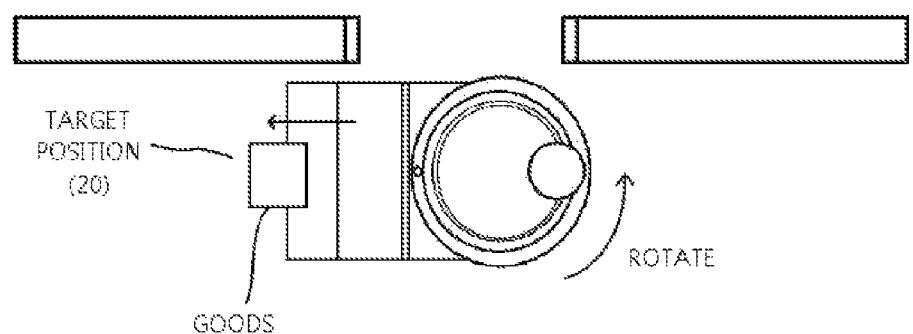

When the target position is determined, the robot 300 may perform predetermined operations with respect to the target position. FIGS. 15 to 20 show various operations of the robot for the target position. For example, the robot 300 may wait at the target position as shown in FIGS. 15 to 17 or may, as shown in FIGS. 18 and 19, move within the target position or around the target position so as to unload the goods at the target position (440). In the embodiment, when the robot 300 is in the current target position or can unload the goods from the current position to the target position, the robot 300 may, as shown in FIG. 20, rotate without moving, if necessary.

In the embodiment, if the goods have to be delivered directly to the recipient, the robot 300 may wait at the target position (450). The robot 300 may identify/authenticate the recipient by using identification information and/or authentication information which are stored in advance or are received through the communication circuit 310, and may wait at the target position until the recipient receives the goods from the container 302.

In various embodiments, the robot 300 may transmit data for notifying that the robot is waiting at the delivery destination to the server, the terminal of the manager, the terminal of the recipient, etc. In various embodiments, when the goods are not received for a predetermined period of time, the robot 300 may return to a place designated by the manager (for example, a distribution center or a delivery vehicle).

When the goods do not need to be delivered directly to the recipient, the robot 300 may unload the goods at the target position (460). In the embodiment, when the robot 300 unloads the goods by using an elevating device or a robot arm, the robot 300 may be damaged or overturned by rebound or vibration. In addition, when the goods are discharged to the outside of the container 302 for being unloaded, the center of gravity of the robot moves toward the outside of the robot 300 by the weight of the goods, so that the robot 300 may be overturned. In order to prevent this problem, in various embodiments, the target position may be determined as a position to which the wall surface is adjacent, such as the first position 10 or the second position 20 of the door. The robot 300 may unload the goods while supporting the wall surface at the target position.

Figure 21:
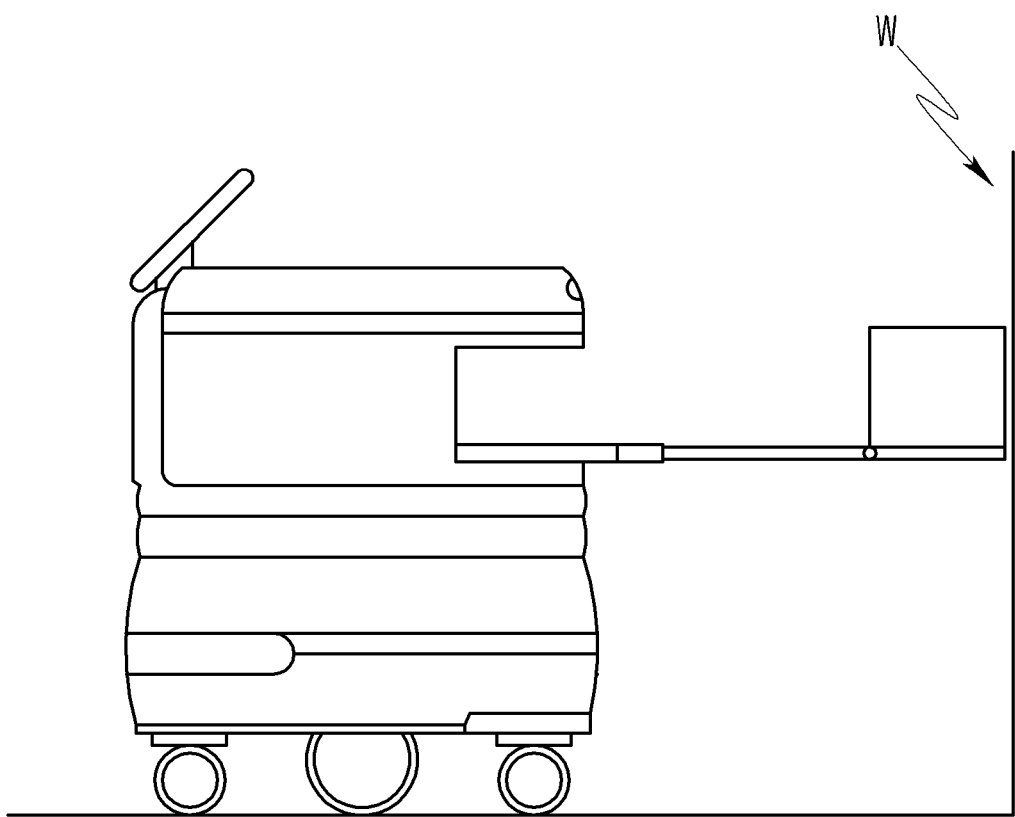
FIGS. 21 and 22 show a method in which the robot unloads goods in accordance with the embodiment.
Figure 22:
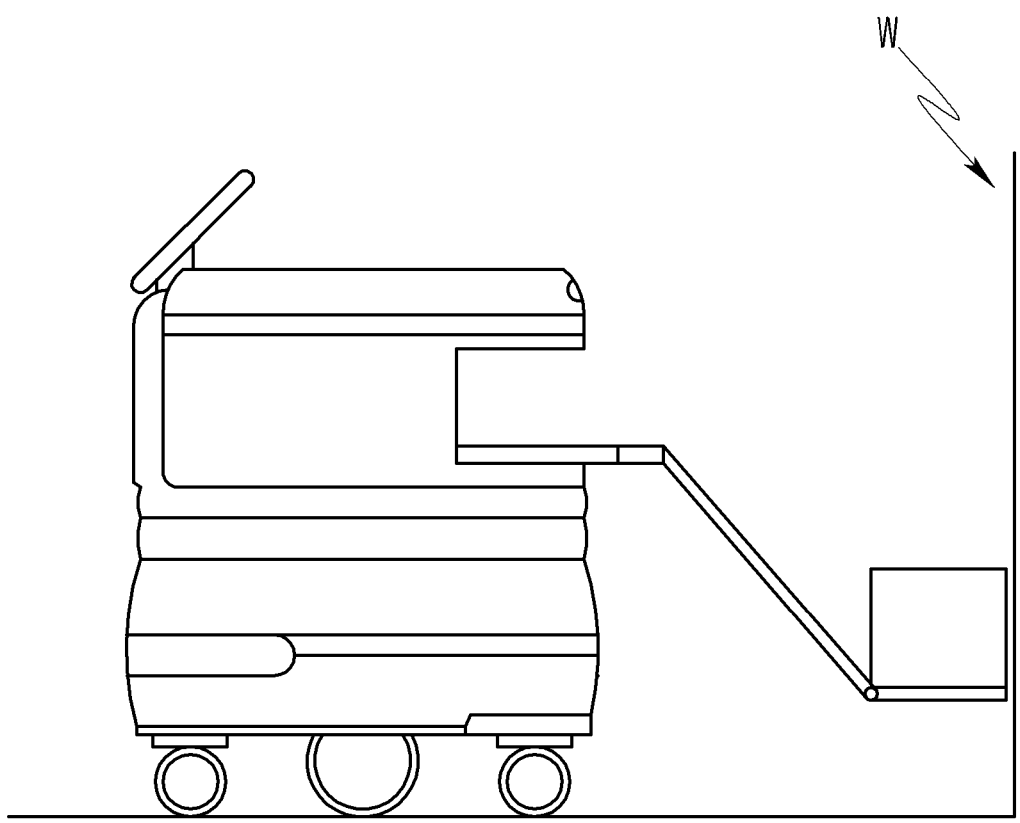
Figure 23:
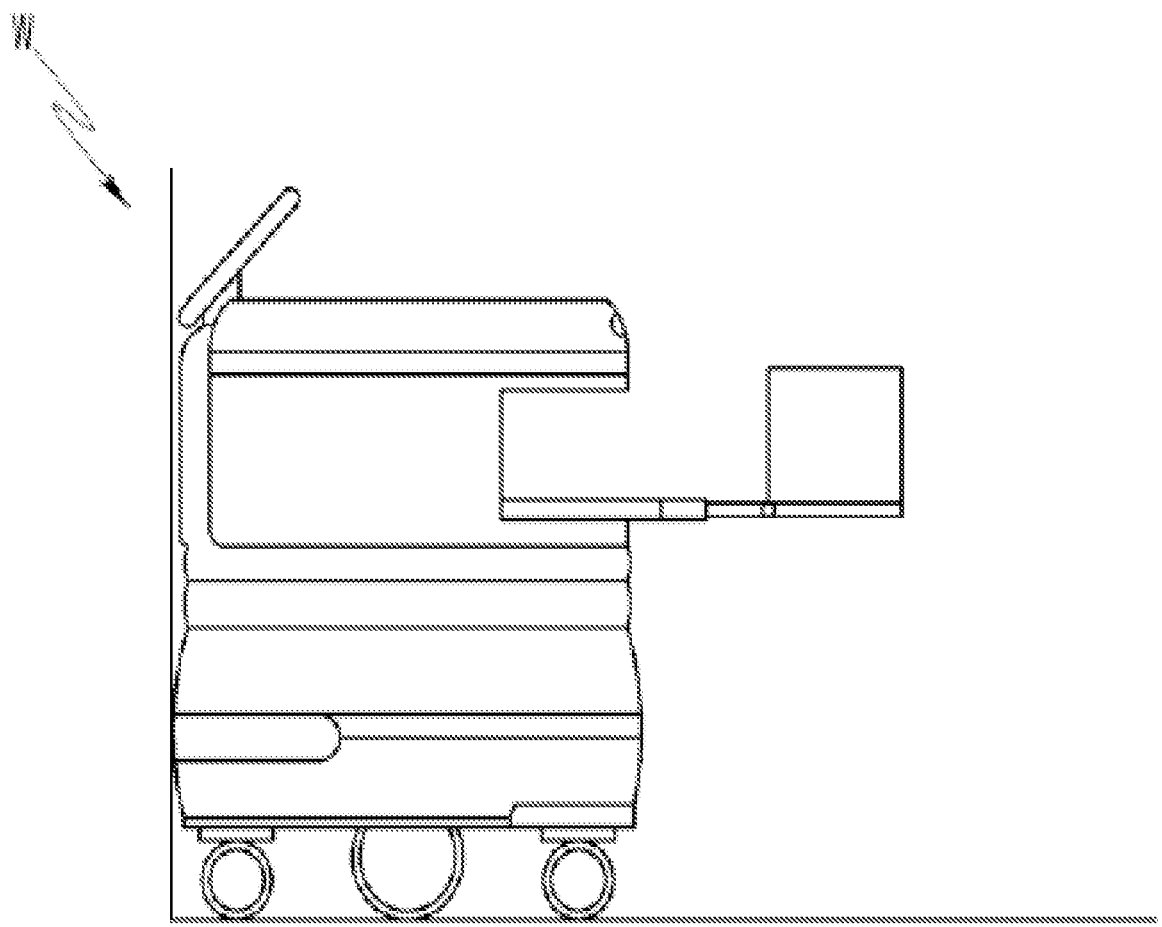
FIGS. 23 and 24 show a method in which the robot unloads goods in accordance with another embodiment.
Figure 24:
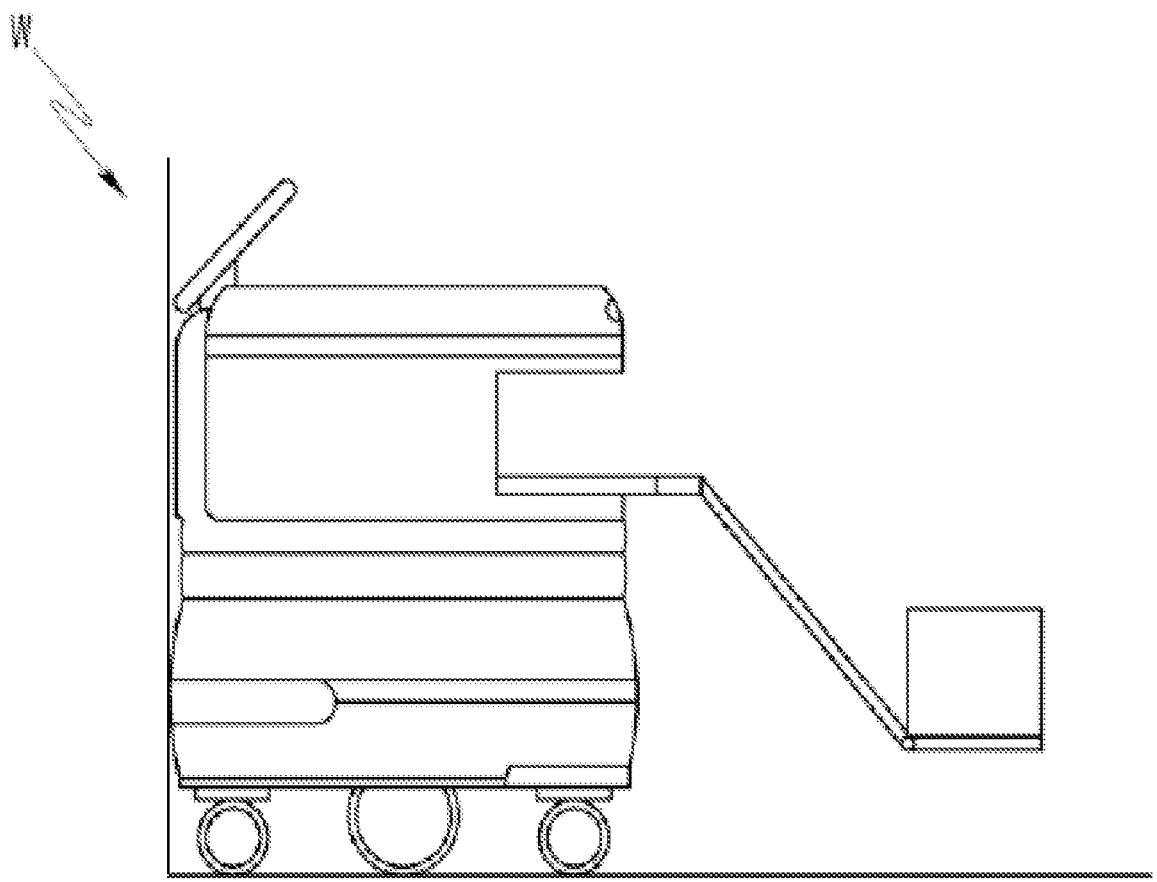

FIGS. 21 and 22 show a method in which the robot unloads goods in accordance with the embodiment. FIGS. 23 and 24 show a method in which the robot unloads goods in accordance with another embodiment. The robot 300 supports, as shown in FIG. 21, the goods discharged from the container 302 on the wall surface W located in front of the robot. Whether or not the goods are sufficiently supported on the wall surface W may be determined through an image captured by the camera 330 or by the sensor 140 capable of measuring an impact force or a reflection force between the goods and the wall surface W. When the goods are supported on the wall surface W, the robot 300 can be prevented from overturning in the direction of the goods even if the center of gravity moves in the direction of the goods. Then, as shown in FIG. 22, the robot 300 may put the goods on the floor while supporting the goods on the wall surface W by controlling the sliding module through the manipulator.

In another embodiment, the rear of the robot 300 may be, as shown in FIG. 23, supported on the wall surface W. To this end, the robot 300 can rotate at the target position. With the rear supported on the wall surface W, the robot 300 may discharge the goods. Then, the robot 300 may, as shown in FIG. 24, put the discharged goods on the floor. In the above embodiments, the rebound or vibration applied to the robot 300 when the goods are unloaded can be absorbed through the wall surface W, so that it is possible to prevent that the robot 300 is tilted by the movement of the center of gravity.

The above-described operations may be performed by the processor 360 of the robot 300. However, in the embodiment, when the robot 300 operates in a cloud environment, at least some of the above-described operations may be performed by a server (e.g., the AI server 200) that communicates with the robot 300 through the cloud network. For example, when the image captured by the camera 330 is transmitted to the server through the communication circuit 310, the server may search the door, extract feature points, and obtain depth information through image analysis. Then, the server may determine the target position of the robot 300 based on the information on the door. The server may transmit a move command including, for example, coordinates and/or vector data as information on the determined target position to the robot 300, and the robot 300 moves to the target position in accordance with the move command received from the server. In addition, the server may transmit a command to wait or a command to unload the goods to the robot 300, and the robot 300 may wait at the target position or unload the goods in accordance with the received command.

Figure 25:
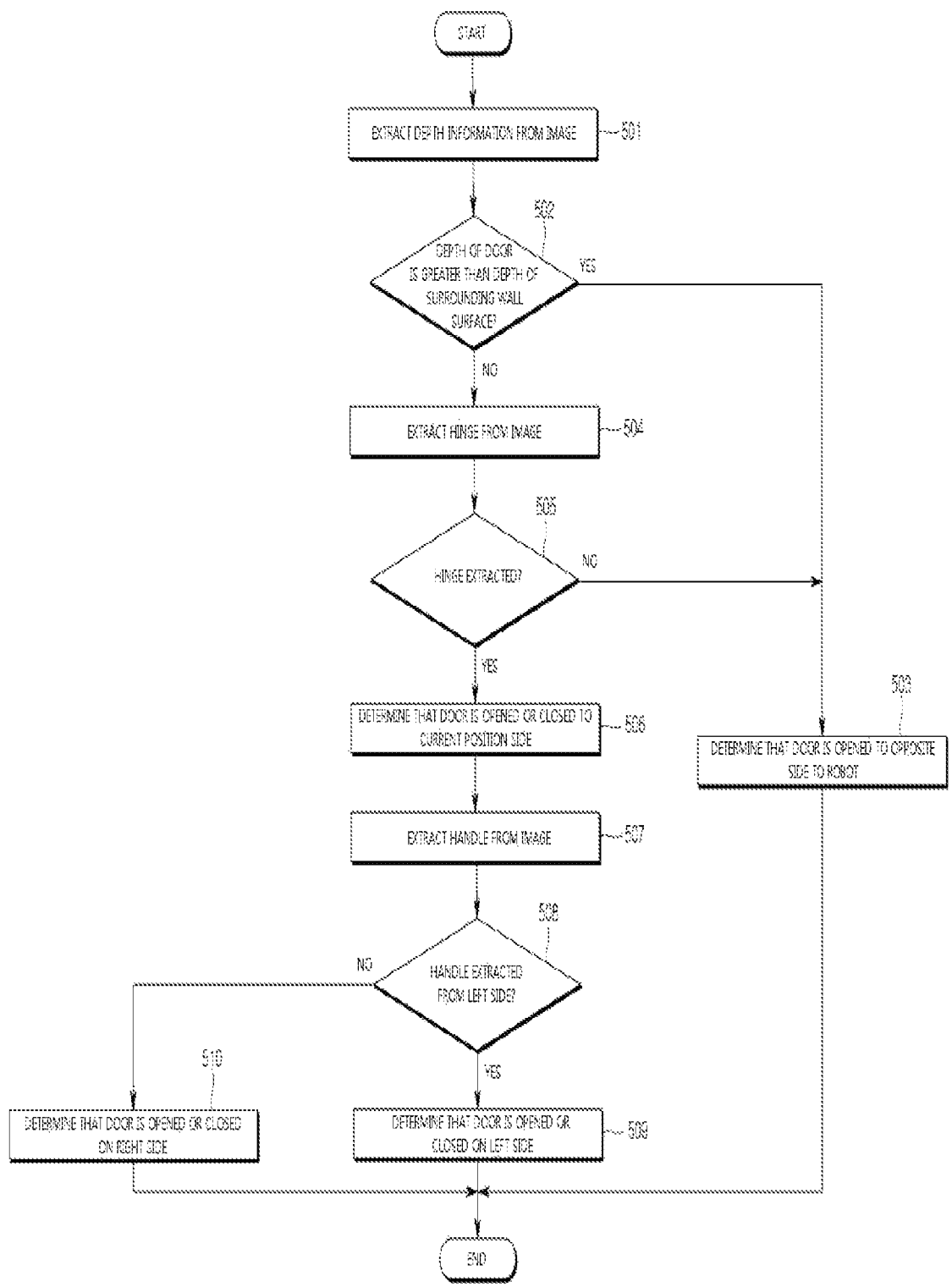
FIG. 25 is a flowchart showing a method for determining the opening direction of the door in accordance with the embodiment.

FIG. 25 is a flowchart showing a method for determining the opening direction of the door in accordance with the embodiment. The method shown in FIG. 25 is an example of the method for determining the door opening direction described with reference to FIG. 6. In the embodiment shown in FIG. 25, the robot 300 determines the opening direction of the door by first considering the depth information and the feature points extracted from the image. In the description of the embodiment of FIG. 25, detailed descriptions of operations the same as or similar to those described with reference to FIG. 6 will be omitted.

Referring to FIG. 25, the robot 300 may extract the depth information from an image (501). The robot 300 may determine whether the depth of the door is greater than the depth of the surrounding wall surface by comparing the depth information of the door and the depth information of the surrounding wall surface of the door (502).

As described with reference to FIG. 9, when the door is deeper than the surrounding wall surface, the door is generally opened to the opposite side to the position of the robot 300. Therefore, based on the depth information, if it is determined that the depth of the door is greater than the depth of the surrounding wall surface by a threshold or more, the robot 300 may determine that the door is opened to the opposite side to the position of the robot 300 (503).

When the depth between the door and the surrounding wall surface is not greater than the threshold, that is, when the depth of the door is substantially the same as the depth of the surrounding wall surface, the robot 300 may extract feature points from the image. In the embodiment, the robot 300 may first extract the hinge as the feature point (504).

As described with reference to FIGS. 9 and 10, when the door is not opened to the side where the robot 300 is located, that is, when the door is opened to the opposite side to the position of the robot 300, or when the door is configured with a sliding door, the hinge may not be viewed and recognized in the current position of the robot 300. Accordingly, when the hinge is not extracted as the feature point in the image (505), the robot 300 may determine that the door is opened to the opposite side to the position of the robot 300 (503).

When the hinge is extracted from the image (505), the robot 300 may determine that the door is opened to the side where the robot 300 is located (506). In this embodiment, the robot 300 may further extract the handle as the feature point (507).

As described with reference to FIGS. 7 and 8, the door may be opened on one side where the handle is disposed. When the handle is extracted from the left side of the door (508), the robot 300 may determine that the door is opened to the side where the robot 300 is located, and is opened on the left side of the door (509). Similarly, when the handle is extracted from the right side of the door (509), the robot 300 may determine that the door is opened to the side where the robot 300 is located, and is opened on the right side of the door (510).

In FIG. 25, the robot 300 considers the depth information first rather than the feature points and determines the opening direction of the door. However, the technical spirit of the present embodiment is not limited thereto. That is, in other various embodiments, the robot 300 may first determine the opening direction of the door based on the feature point, for example, a hinge, and additionally or complementally use the depth information to determine the opening direction of the door. Alternatively, the robot 300 may determine the opening direction of the door by using only the feature points.

It can be understood by those skilled in the art that the embodiments can be embodied in other specific forms without departing from its spirit or essential characteristics. Therefore, the foregoing embodiments and advantages are merely exemplary and are not to be construed as limiting the present invention. The scopes of the embodiments are described by the scopes of the following claims rather than by the foregoing description. All modification, alternatives, and variations derived from the scope and the meaning of the scope of the claims and equivalents of the claims should be construed as being included in the scopes of the embodiments.

Various embodiments of the present disclosure provide a robot capable of unloading goods or being waiting at an appropriate position where the moving line of a recipient is not disturbed, and provide a method for controlling the robot. Various embodiments of the present disclosure provide the robot which judges door information from images and determines a moving position based on the judged information, and provide a method for controlling the robot. Various embodiments of the present disclosure provide the robot which waits for a recipient or unloads goods at the determined moving position, and provide a method for controlling the robot. Various embodiments of the present disclosure provide the robot which unloads goods by using a wall surface identified from the image as a support, and provide a method for controlling the robot.

One embodiment is a robot including: at least one motor provided in the robot; a camera configured to capture an image of a door; and a processor configured to determine, based on at least one of depth information and a feature point identified from the image, a target position not overlapping with a moving area of the door, and control the at least one motor such that predetermined operations are performed with respect to the target position. The feature point may include at least one of a handle and a hinge of the door.

When the hinge is extracted from the image, the processor may determine a position that is in contact with a wall surface disposed further away from the hinge among wall surfaces on both sides of the door as the target position. When the hinge is not identified from the image, the processor may determine a position that is in contact with the door as the target position.

When the hinge is identified from the image, the processor may determine a width length of the door and determines a position spaced apart from the door by the width length as the target position. When the hinge and the handle are extracted from the image, the processor may determine a position that is in contact with a wall surface disposed adjacent to the handle among wall surfaces on both sides of the door as the target position. When a depth of the door is greater than depths of surrounding wall surfaces of the door by a threshold or more, the processor may determine a position that is in contact with the door as the target position.

The processor may control the at least one motor such that the robot moves or rotates with respect to the target position. The processor may control the at least one motor such that the robot unloads goods at the target position. As the at least one motor is controlled, the robot may discharge the goods to the outside of a body of the robot and unload the discharged goods while supporting the goods on a wall surface that is in contact with the target position. As the at least one motor is controlled, the robot may support one side of a body of the robot on the wall surface that is in contact with the target position, discharge the goods to the other side that faces the one side, and unload the discharged goods.

Another embodiment is a method for controlling the robot according to the embodiment of the present invention includes: capturing an image of a door; determining, based on at least one of depth information and a feature point extracted from the image, a target position not overlapping with a moving area of the door; and controlling at least one motor which is provided in the robot such that predetermined operations are performed with respect to the target position. The feature point may include at least one of a handle and a hinge of the door.

The determining the target position may include: extracting the hinge from the image; and determining a position that is in contact with a wall surface disposed further away from the hinge among wall surfaces on both sides of the door as the target position. The method may include determining a position that is in contact with the door as the target position when the hinge is not extracted from the image.

The determining the target position may include: extracting the hinge from the image; determining a width length of the door; and determining a position spaced apart from the door by the width length as the target position. The determining the target position may include: extracting the hinge and the handle from the image; and determining a position that is in contact with a wall surface disposed adjacent to the handle among wall surfaces on both sides of the door as the target position.

The determining the target position may include determining a position that is in contact with the door as the target position when a depth of the door is greater than depths of surrounding wall surfaces of the door by a threshold or more. The controlling the at least one motor may include controlling the at least one motor such that the robot moves or rotates with respect to the target position. The controlling the at least one motor may control the at least one motor such that the robot unloads goods at the target position.

In certain implementations, a robot comprises: at least one motor; a camera configured to capture an image of a door;

and a processor configured to: determine, based on a feature point identified from the image, a target position not overlapping a moving area of the door, and control the at least one motor such that at least one operation is performed with respect to the target position, wherein the feature point includes at least one of a handle or a hinge of the door.

When the hinge of the door is identified in the image, a first wall surface is positioned at a first side of the door that is further from the hinge, and second wall surface is positioned at a second side of the door that is closer to the hinge, and the processor selects, as the target position, a position in front of the first wall surface. When the hinge of the door is not identified in the image, the processor selects a position that is in front of the door as the target position.

When the hinge is identified in the image, the processor determines a width of the door and selects a position that is spaced apart from the door by at least the width as the target position. When the hinge and the handle of the door are identified in the image, a first wall surface is positioned at a first side of the door that is further from the hinge and closer to the handle, and second wall surface is positioned at a second side of the door that is closer to the hinge and further from the handle, and the processor selects, as the target position, a position that is in front of the first wall surface.

The processor is further to determine the target position based on depth information associated with a depth of a door, and when the depth of the door is greater than depths of one or more surrounding wall surfaces by at least a threshold distance, the processor select a position that is in front of the door as the target position.

The processor controls the at least one motor such that the robot at least one of moves or rotates with respect to the target position. The processor controls the at least one motor such that the robot unloads a good at the target position. When the robot is unloading the good, the processor may manage the at least one motor such that the robot discharges the good to an outside of a body of the robot and supports the good on a wall surface adjacent to the target position. Alternatively, when the robot is unloading the good, the processor is further to manage the at least one motor such that a first side of a body of the robot is positioned against a wall surface that is adjacent the target position, and the robot discharges the good to a second side that is opposite to the first side.

In another example, a robot comprises: at least one motor to move the robot; a camera configured to capture an image of a door; and a processor configured to: determine a presence or an absence of a hinge of the door in the image, and control the at least one motor to move the robot to avoid a swing path of the door and to perform at least one operation away from the swing path of the door based on the presence or the absence of the hinge in the image.

When the presence of the hinge is determined in the image, and the door is positioned between a first wall surface and a second wall surface that is closer to the hinge than the first wall surface, the processor controls the at least one motor to position the robot in front of the first wall surface. When the absence of the hinge is determined in the image, the processor controls the at least one motor to position the robot in front of the door.

When the presence of the hinge is determined in the image, the processor determines a width of the door and controls the at least one motor to position the robot to be spaced apart from the door by at least the width of the door. When the presence of the hinge and a presence of a handle of the door are determined in the image, and the door is positioned between a first wall surface and a second wall surface that is farther from the handle than the first wall surface, the processor controls the at least one motor to position the robot in front of the first wall surface.

The processor may further: determine depth information associated with a depth of a door relative to a depth of at least one surrounding wall surface, and control the at least one motor to position the robot in front of the door when the depth of the door is greater than the depth of the at least one surrounding wall surface by at least a threshold distance.

The processor may control the at least one motor such that the robot at least one of moves or rotates to avoid the swing path of the door. The processor controls the at least one motor such that the robot unloads a good at a position out of the swing path of the door. When the robot is unloading the good, the processor may control the at least one motor such that the robot discharges the good to an outside of a body of the robot and supports the good on a wall surface adjacent to the position out of the swing path of the door. When the robot is unloading the good, the processor may control the at least one motor such that a first side of a body of the robot is positioned against a wall surface that is adjacent to the position out of the swing path of the door, and the robot discharges the good to a second side that is opposite to the first side.

Through the robot according to various embodiments and the method for controlling the robot, it is possible to complete delivering goods safely even though a recipient cannot receive the goods directly. Through the robot according to various embodiments and the method for controlling the robot, the recipient is able to receive the goods delivered by the robot without being disturbed the moving line of the recipient.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element (s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A robot comprising:
   at least one motor;
   a camera configured to capture an image of a door; and
   a processor configured to:
   extract feature points including at least one of a handle or a hinge of the door from the image,
   determine, based on the extracted feature points, a target position for unloading goods, and
   control the at least one motor such that the robot unloads goods at the target position,
   wherein the processor, when determining the target position, is further configured to:
   determine a position in front of a wall surface disposed further away from the hinge among two wall surfaces on both sides of the door as the target position when the hinge is extracted as one of the feature points,
   determine a position in front of a wall surface disposed adjacent to the handle among the two wall surfaces on both sides of the door as the target position when the hinge and the handle are extracted as the feature points, and
   determine a position in front of the door as the target position when the hinge is not extracted as the feature points.

2. The robot of claim 1, wherein, when the hinge of the door is identified in the image, the processor determines a width of the door and selects a position that is spaced apart from the door by at least the width as the target position.

3. The robot of claim 1, wherein the processor is further configured to:
   determine, based on depth information, whether a depth of the door is greater than a depth of the surrounding wall surface by at least a threshold distance, and
   if the depth of the door is greater than the depth of the surrounding wall surface by at least the threshold distance, determine the direction in which the door is to be opened as a direction opposite to the robot.

4. The robot of claim 1, wherein the processor controls the at least one motor such that the robot at least one of moves or rotates with respect to the target position.

5. The robot of claim 1, wherein, when the robot is unloading the goods, the processor is further configured to manage the at least one motor such that the robot discharges the goods to an outside of a body of the robot and supports the goods on a wall surface adjacent to the target position.

6. The robot of claim 1, wherein, when the robot is unloading the goods, the processor is further configured to manage the at least one motor such that a first side of a body of the robot is positioned against a wall surface that is adjacent the target position, and the robot discharges the goods to a second side that is opposite to the first side.

7. A robot comprising:
   at least one motor to move the robot;
   a camera configured to capture an image of a door; and
   a processor configured to:
   extract feature points including t least one f a handle or a hinge of the door from the image,
   determine, based on the extracted feature points, a target position for unloading goods, and
   control the at least one motor to move the robot to avoid a swing path of the door and to perform unloading of goods at the target position,
   wherein the processor, when determining the target position, is further configured to:
   when the door is in a closed state, obtain depth information indicating a depth of the door with respect to the two, wall surfaces,
   determine a direction in which the door is to be opened based on the depth information,
   determine, based on the extracted feature points and the determined direction, the target position,
   determine a position in front of a wall surface disposed further away from the hinge among two wall surfaces on both sides of the door as the target position when the hinge is extracted as one of the feature points,
   determine a position in front of a wall surface disposed adjacent to the handle among the two surfaces on both sides of the door as the target position when the hinge and the handle are extracted as the feature points, determine a position front of the door as the target position when the hinge is not extracted as the feature points.

8. The robot of claim 7, wherein, when the presence of the hinge is determined in the image, the processor determines a width of the door and controls the at least one motor to position the robot to be spaced apart from the door by at least the width of the door.

9. The robot of claim 7, wherein the processor is further configured to:

determine, based on the depth information, whether a depth of the door is greater than a depth of the surrounding wall surface by at least a threshold distance, and if the depth of the door is greater than the depth of the surrounding wall surface by at least the threshold distance, determine the direction in which the door is to be opened as a direction opposite to the robot.

10. The robot of claim 7, wherein the processor controls the at least one motor such that the robot at least one of moves or rotates to avoid the swing path of the door.

11. The robot of claim 7, wherein, when the robot is unloading the goods, the processor is further configured to control the at least one motor such that the robot discharges the goods to an outside of a body of the robot and supports the goods on a wall surface adjacent to the target position.

12. The robot of claim 7, wherein, when the robot is unloading the goods, the processor is further configured to control the at least one motor such that a first side of a body of the robot is positioned against a wall surface that is adjacent to the target position, and the robot discharges the goods to a second side that is opposite to the first side.

* * * * *